United States Patent
Li et al.

(10) Patent No.: US 11,414,529 B2
(45) Date of Patent: Aug. 16, 2022

(54) POLYSTYRENE COMPOSITIONS FOR FOAM EXTRUSION

(71) Applicant: Fina Technology, Inc., Houston, TX (US)

(72) Inventors: Fengkui Li, Houston, TX (US); Jayna Brown, Houston, TX (US); Ying Wang, Houston, TX (US); Wyman T. Stephens, Baytown, TX (US)

(73) Assignee: FINA TECHNOLOGY, INC., Houston, TX (US)

( * ) Notice: Subject to any disclaimer, the term of this patent is extended or adjusted under 35 U.S.C. 154(b) by 68 days.

(21) Appl. No.: 16/014,883

(22) Filed: Jun. 21, 2018

(65) Prior Publication Data
US 2019/0390026 A1    Dec. 26, 2019

(51) Int. Cl.
| | | |
|---|---|---|
| C08J 9/12 | (2006.01) | |
| C08J 9/14 | (2006.01) | |
| C08F 12/08 | (2006.01) | |
| C08J 9/00 | (2006.01) | |
| C08K 5/01 | (2006.01) | |
| C08K 5/103 | (2006.01) | |
| C08K 5/12 | (2006.01) | |
| C08L 25/06 | (2006.01) | |
| B29C 48/00 | (2019.01) | |
| B29C 44/20 | (2006.01) | |
| B29K 25/00 | (2006.01) | |
| B29K 105/00 | (2006.01) | |
| B29K 105/04 | (2006.01) | |

(52) U.S. Cl.
CPC ............... *C08J 9/146* (2013.01); *C08F 12/08* (2013.01); *C08J 9/0014* (2013.01); *C08J 9/0023* (2013.01); *C08J 9/122* (2013.01); *C08K 5/01* (2013.01); *C08K 5/103* (2013.01); *C08K 5/12* (2013.01); *C08L 25/06* (2013.01); *B29C 44/20* (2013.01); *B29C 48/022* (2019.02); *B29K 2025/06* (2013.01); *B29K 2105/0005* (2013.01); *B29K 2105/04* (2013.01); *C08J 2201/03* (2013.01); *C08J 2203/06* (2013.01); *C08J 2203/142* (2013.01); *C08J 2203/162* (2013.01); *C08J 2325/06* (2013.01); *C08J 2447/00* (2013.01)

(58) Field of Classification Search
CPC ........ C08J 9/146; C08J 9/0014; C08J 9/0023; C08J 9/122; C08J 2203/162; C08J 2203/142; C08J 2203/06; C08J 2325/06; C08F 12/08; B29C 48/022; B29C 44/20
See application file for complete search history.

(56) References Cited

U.S. PATENT DOCUMENTS

| | | | |
|---|---|---|---|
| 5,776,389 A | 7/1998 | Chaudhary | |
| 6,245,266 B1 | 6/2001 | Ramesh et al. | |
| 8,648,122 B2 | 2/2014 | Cassidy et al. | |
| 8,648,123 B2 * | 2/2014 | Van Horn | C08J 9/149 521/98 |
| 2008/0058435 A1 * | 3/2008 | Allmendinger | C08K 5/5313 521/107 |
| 2012/0208913 A1 | 8/2012 | Wang et al. | |
| 2014/0316020 A1 * | 10/2014 | Han | C08J 9/0009 521/79 |
| 2015/0166752 A1 * | 6/2015 | Scholz | C08J 9/122 521/79 |

FOREIGN PATENT DOCUMENTS

| | | |
|---|---|---|
| EP | 0528536 A1 | 2/1993 |
| WO | 94/16876 A1 | 8/1994 |
| WO | 97/22656 A1 | 6/1997 |
| WO | WO-9722656 A1 * | 6/1997 ............. B32B 27/08 |
| WO | 2014/066089 A1 | 5/2014 |
| WO | WO-2014066089 A1 * | 5/2014 ............. C08L 25/06 |

OTHER PUBLICATIONS

Data Sheet for Styrolution PS 153F from INEOS. (Year: 2016).*
Data Sheet for PS 148G Polystyrene. MatWeb. (Year: 2021).*
Data Sheet for 9,10-dihydroxo-9-oxa-10-phosphaphenanthrene 10-oxide (DOPO) from Hainan Zhongxin Chemical Co., Ltd (Year: 2021).*
PCT/US2019/037824 International Search Report and Written Opinion dated Sep. 11, 2019 (16 p.).

* cited by examiner

*Primary Examiner* — Kara B Boyle
(74) *Attorney, Agent, or Firm* — Albert Shung

(57) ABSTRACT

A polystyrene (PS) composition for making an extruded foam, the PS composition comprising polystyrene, a blowing agent, and an additive selected from glycerol monostearate (GMS), glycerol tri-stearate (GTS), mineral oil (MO), epoxidized soy oil (ESO), epoxidized polybutadiene, or combinations thereof. Methods of producing a low density polystyrene (PS) foam are also provided.

21 Claims, 9 Drawing Sheets

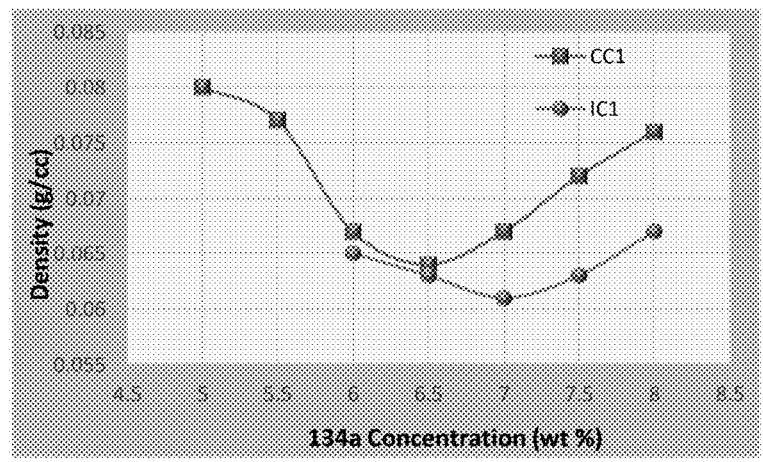
FIG. 1
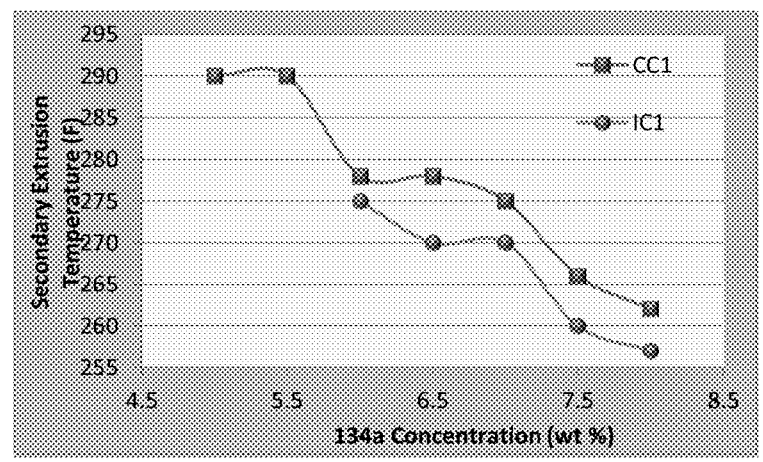
FIG. 2
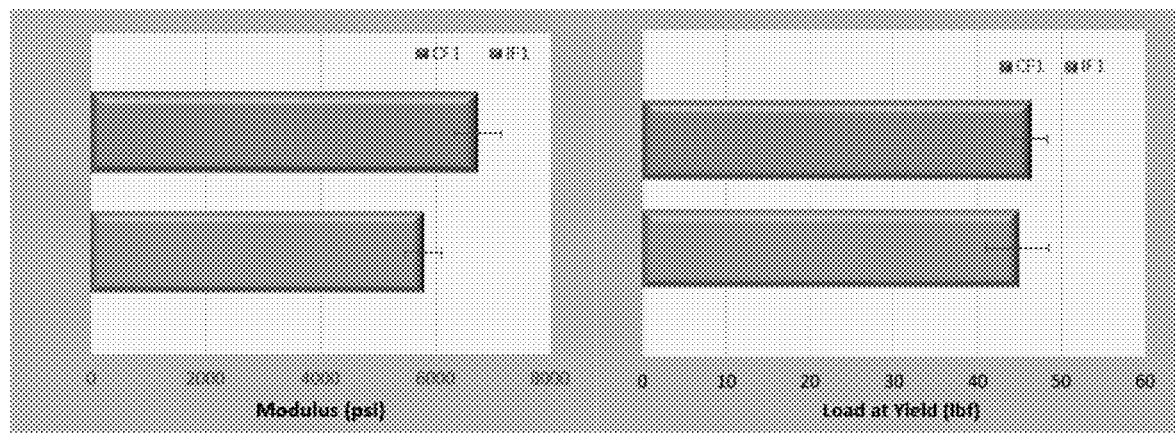
FIG. 3A                    FIG. 3B

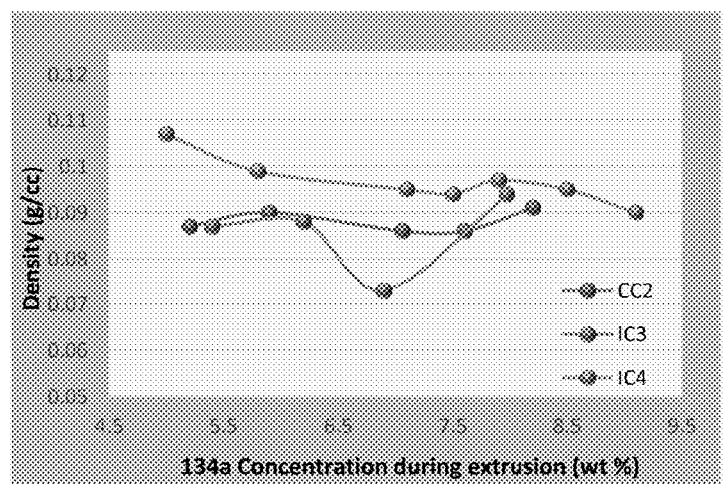
FIG. 6
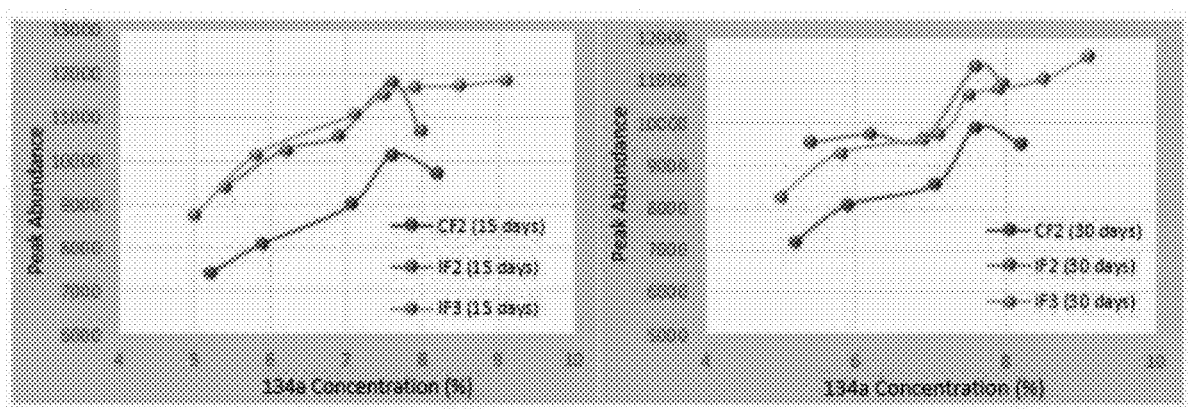
FIG. 7A
FIG. 7B

POLYSTYRENE COMPOSITIONS FOR FOAM EXTRUSION

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present disclosure relates to the production of polystyrene (PS) foams. More particularly, the present disclosure provides PS compositions and methods for increasing the solubility and/or retention of blowing agent(s) during PS foam extrusion. Still more particularly, the present disclosure provides PS compositions and methods for producing PS foams having desirable insulative properties, and PS foams produced thereby.

BACKGROUND

Polystyrene foams and methods of manufacturing polystyrene foam rods, planks, and sheets are well known in the art. Polystyrene (PS) foams formed utilizing hydrofluorocarbon (HFC) blowing agents, such as HFC 134a, have been widely used for the construction of insulation boards. According to foam manufacturers, high HFC blowing agent concentrations are desirable in the foam boards for superior insulation properties (e.g., as measured by R-value). The physical blowing agents commonly used (e.g., hydrochlorofluorocarbons (HCFCs), hydrofluorocarbons (HFCs), or combinations thereof) can lead to the formation of smog, have high ozone depletion potential or global warming potential (GWP), and/or can be hazardous air pollutants. For example, due to its high GWP (global warming potential), some HFCs, including HFC 134a, will be banned by 2021.

Polystyrene foamed insulation board manufacturers have thus been actively seeking alternatives to HFCs, such as HFC 134a. Hydrofluoroolefins (HFOs) appear to be one of the candidates due to the zero GWPs thereof.

Despite the advances in foam production, there still exists a need for a simple and economical approach to achieving enhanced blowing agent solubility including both HFCs and HFOs in polystyrene compositions for foam extrusion and/or to enhance retention of the blowing agent(s) in polystyrene foams.

SUMMARY

Herein disclosed is a polystyrene (PS) composition for making an extruded foam, the PS composition comprising: polystyrene; a blowing agent; and an additive selected from glycerol monostearate (GMS), glycerol tri-stearate (GTS), mineral oil (MO), epoxidized soy oil (ESO), epoxidized polybutadiene, or combinations thereof.

Also disclosed herein is a low density polystyrene (PS) foam produced via extrusion of a PS composition comprising polystyrene; a blowing agent; and an additive selected from glycerol monostearate (GMS), glycerol tri-stearate (GTS), mineral oil (MO), epoxidized soy oil (ESO), epoxidized polybutadiene, or combinations thereof; wherein the low density PS foam contains a higher blowing agent concentration than that of an otherwise similar low density foam that does not contain the additive.

Further disclosed herein is a low density polystyrene (PS) foam produced via extrusion of a PS composition comprising polystyrene; a blowing agent; and an additive selected from glycerol monostearate (GMS), glycerol tri-stearate (GTS), mineral oil (MO), epoxidized soy oil (ESO), epoxidized polybutadiene, or combinations thereof; wherein the low density PS foam exhibits at least one superior insulative property relative to that of an otherwise similar low density foam that does not contain the additive.

Also disclosed herein is a low density polystyrene (PS) foam produced via extrusion of a PS composition comprising polystyrene; a blowing agent; and an additive selected from glycerol monostearate (GMS), glycerol tri-stearate (GTS), mineral oil (MO), epoxidized soy oil (ESO), epoxidized polybutadiene, or combinations thereof; wherein the low density PS foam exhibits at least one mechanical property that is at least comparable to that of an otherwise similar low density foam that does not contain the additive.

Further disclosed herein is a low density polystyrene (PS) foam produced via extrusion of a PS composition comprising polystyrene; a blowing agent; and an additive selected from glycerol monostearate (GMS), glycerol tri-stearate (GTS), mineral oil (MO), epoxidized soy oil (ESO), epoxidized polybutadiene, or combinations thereof; wherein the blowing agent comprises one or more hydrofluoroolefins, and wherein the low density PS foam exhibits at least one insulative property that is at least equivalent to that of an otherwise similar low density foam produced in the absence of the additive and with one or more blowing agents selected from hydrofluorocarbons (HFCs).

Also disclosed herein is a method of producing a low density polystyrene (PS) foam, the method comprising: blending polystyrene (PS), a blowing agent, and an additive selected from glycerol monostearate (GMS), glycerol tri-stearate (GTS), mineral oil (MO), epoxidized soy oil (ESO), epoxidized polybutadiene, or combinations thereof to form a foamable mixture; and producing a foam by extruding the foamable mixture through a die and into a region of reduced pressure.

Further disclosed herein is a method of producing a low density polystyrene (PS) foam, the method comprising: blending polystyrene (PS), a blowing agent, and a masterbatch containing an additive selected from glycerol monostearate (GMS), glycerol tri-stearate (GTS), mineral oil (MO), epoxidized soy oil (ESO), epoxidized polybutadiene, or combinations thereof to form a foamable mixture; and producing a foam by extruding the foamable mixture through a die and into a region of reduced pressure.

Further disclosed herein is a low density polystyrene (PS) foam produced via a method comprising: blending polystyrene (PS), a blowing agent, and an additive selected from glycerol monostearate (GMS), glycerol tri-stearate (GTS), mineral oil (MO), epoxidized soy oil (ESO), epoxidized polybutadiene, or combinations thereof to form a foamable mixture; and producing a foam by extruding the foamable mixture through a die and into a region of reduced pressure.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

FIG. 1 is a plot of wet density (g/cc) as a function of the concentration (wt %) of blowing agent HFC 134a for compositions of Example 1.

FIG. 2 is a plot of secondary extrusion temperature (° F.) as a function of the concentration (wt %) of blowing agent HFC 134a for compositions of Example 1;

FIG. 3A is a bar graph of the compressive modulus (psi) for the foams of Example 1;

FIG. 3B is a bar graph of the load at yield ($lb_f$) for the foams of Example 1;

FIG. 6 is a plot of wet density (g/cc) as a function of the concentration (wt %) of blowing agent HFC 134a for compositions of Example 3;

FIG. 7A is a plot of the peak abundance, at fifteen days, of blowing agent HFC 134a in the GC headspace as a function of the concentration of the blowing agent HFC 134a for foams of Example 3;

FIG. 7B is a plot of the peak abundance, at thirty days, of blowing agent HFC 134a in the GC headspace as a function of the concentration of the blowing agent HFC 134a for foams of Example 3;

DETAILED DESCRIPTION

Figure 4:
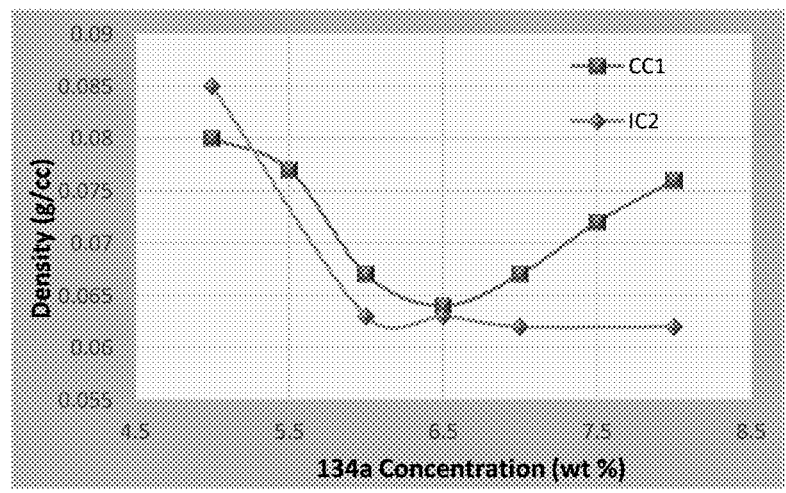
FIG. 4 is a plot of wet density (g/cc) as a function of the concentration (wt %) of blowing agent HFC 134a for compositions of Example 2.

It should be understood at the outset that although an illustrative implementation of one or more embodiments are provided below, the disclosed compositions, methods, and/or products may be implemented using any number of techniques, whether currently known or in existence. The disclosure should in no way be limited to the illustrative implementations, drawings, and techniques illustrated hereinbelow, including the exemplary designs and implementations illustrated and described herein, but may be modified within the scope of the appended claims along with their full scope of equivalents.

Definitions

While the following terms are believed to be well understood by one of ordinary skill in the art, the following definitions are set forth to facilitate explanation of the presently disclosed subject matter. Unless defined otherwise, all technical and scientific terms used herein have the same meaning as commonly understood to one of ordinary skill in the art to which the presently disclosed subject matter belongs.

Styrene, also known, as vinyl benzene, is an aromatic compound that is produced in industrial quantities from ethylbenzene. The most common method of styrene production comprises the dehydrogenation of ethylbenzene, which produces a crude product of styrene monomer and unreacted ethylbenzene and hydrogen. Polystyrene is an aromatic polymer produced from the styrene monomer. Polystyrene is a widely used polymer found in insulation, packaging, and disposable cutlery, as well as foamed products including foam cups.

Different types of polystyrene materials can include general-purpose polystyrene (GPPS) and high impact polystyrene (HIPS). Many conditions affect the properties of the resulting product, including processing time, temperature, pressure, purity of the monomer feedstock, and the presence of additives or other compounds. These and other processing conditions alter the physical and chemical properties of the polystyrene product, affecting the suitability for a desired use.

Foamed polystyrene offers the advantages of low cost, light weight and high structural strength for its density. A typical polystyrene foam also has a relatively high impact resistance and possesses excellent electrical and thermal insulation characteristics. Foamed polystyrene is useful in a variety of applications such as insulation, packaging, coolers, food packaging, decorative pieces, and dunnage used to protect and secure cargo during transportation. Additionally, polystyrene foams are commonly classified into three general categories: low density, medium density, and high density. Low density polystyrene foams usually have a density of from about 1 to about 3 $lb/ft^3$ whereas medium density foams may have a density ranging from about 4 to about 19 $lb/ft^3$ and high density foams often have a density ranging from 20 to about 30 $lb/ft^3$.

The two main types of polystyrene foams are extruded polystyrene (XPS) foam and expanded polystyrene (EPS) foam. Extruded polystyrene foam is typically formed by mixing polystyrene with additives and blowing agents into an extruder that heats the mixture. The mixture is then extruded, foamed to the desired shape, and cooled. Expanded polystyrene foam is typically formed by expanding solid polystyrene beads containing a blowing agent such as pentane with steam or hot gas. These pre-expanded beads may later be molded into the desired shape and expanded again with steam or hot gas to fuse the beads together.

The term "blowing agent" as used herein refers to any of a wide variety of substances that alone or in combination with at least one other substance is capable of producing a cellular structure in a plastic mass. Thus, the term includes, but is not limited to, gases that expand when pressure is released, soluble solids that leave pores when leached out, liquids that develop cells when they change to gases, and/or chemical agents that decompose or react under the influence of heat to form a gas.

In the production of extruded polystyrene foam, it is common to utilize blowing agents such as methyl chloride, ethyl chloride, chlorocarbons, fluorocarbons (including HFCs) and chlorofluorocarbons (CFCs). However, such blowing agents have been heavily regulated due to potential environmental impact including ozone depletion or global warming. An ongoing trend in extrusion foaming process development is to find environmentally benign chemicals as blowing agents. Some foaming processes have been using hydrofluoroolefins (HFOs) or carbon dioxide ($CO_2$) as the blowing agent or co-blowing agent. For desired insulating properties, HFOs are preferred due to their low thermal conductivity and minimal environmental impact. However, HFO solubility in polystyrene needs further improvement in order to meet the stringent regulatory requirement for the construction insulation foam boards.

The term "fatty acid" as used herein refers to long-chain aliphatic acids (alkanoic acids) of varying chain lengths.

The term "thermoplastic foam" refers to a cellular polymer wherein numerous gas bubbles or cells are distributed in a polymer matrix that can be repeatedly heated, melted, shaped, and cooled. As a result, thermoplastic foams can be easily melted and recycled. The polystyrene foams produced according to this disclosure may be thermoplastic foams.

Although the majority of the above definitions are substantially as understood by those of skill in the art, one or more of the above definitions can be defined hereinabove in a manner differing from the meaning as ordinarily understood by those of skill in the art, due to the particular description herein of the presently disclosed subject matter.

Overview

This disclosure describes polystyrene (PS) compositions that enable PS to retain a greater concentration of blowing agent(s) in the finished foams and/or improve the solubility of physical blowing agents such as, without limitation, HFCs (hydrofluorocarbons), HFOs (hydrofluoroolefins), and carbon dioxide ($CO_2$), in polystyrene during foam extrusion. Specifically, the PS compositions comprise polystyrene (e.g., crystal polystyrene) containing low levels of one or more solubility and/or retention additives (referred to hereinafter as 'SRA's). The SRAs can be selected from epoxidized soy oil (ESO), epoxidized polybutadiene, mineral oil (MO), glycerol monostearate (GMS), glycerol tristearate (GTS), IRGANOX 1010® (pentaerythritol tetrakis (3-(3,5-di-tert-butyl-4-hydroxyphenyl)propionate), or combinations thereof.

In embodiments, the PS compositions of this disclosure have broader foam extrusion processing windows, as indicated by foamability at higher blowing agent concentration and/or a wider range of temperatures. In embodiments, PS foams (e.g., low density PS foams) resulting from extrusion/blowing of the herein-disclosed PS compositions possess a higher blowing agent (e.g., HFC or HFO) concentration and, thus, superior insulative properties. A potential advantage of the PS compositions of this disclosure is that such compositions may enable polystyrene insulation board manufacturers to replace the commonly used HFC 134 with low GWP (global warming potential) blowing agents, such as HFO.

Carbon dioxide ($CO_2$) is known to have a very low solubility in PS. In embodiments, the presence of one or more SRAs in a PS composition of this disclosure increases the $CO_2$ solubility by at least 10, 20, or 30% during foam extrusion. The SRAs can, in embodiments, be present in the PS composition in a range of from about 100 ppm to about 2% by weight. This may make $CO_2$ more useful and favorable as a co-blowing agent in certain low density PS foam applications. For example, producers of commodity foam products, such as clam shell containers, plates, meat trays, etc., primarily use high solubility hydrocarbon blowing agents to produce low density foams. The SRA(s)-containing PS compositions of this disclosure may enable transitioning to a non-flammable, inexpensive, and low GWP (global warming potential) blowing agent, such as $CO_2$, with enhanced blowing agent solubility during extrusion and/or enhanced retention of the blowing agent in the produced foam.

Herein-Disclosed PS Composition

Herein-disclosed are polystyrene (PS) compositions (also referred to herein as 'PS blends', 'PS formulations' or 'foamable mixtures') for making a polystyrene foam. The herein-disclosed PS composition comprises polystyrene and an SRA. As detailed hereinbelow, the PS composition can further comprise a blowing agent. In embodiments, polystyrene (e.g., crystal polystyrene) is formulated with small amounts of commercially available SRAs to achieve a desired high blowing agent solubility during extrusion, an increased blowing agent retention in the resulting PS foam, and/or enhanced foam mechanical properties. In embodiments, the SRA(s) may be selected from glycerol monostearate (GMS), glycerol tri-stearate (GTS), mineral oil (MO), epoxidized soy oil (ESO), epoxidized polybutadiene, or combinations thereof.

Two major challenges exist for the use of HFOs as blowing agents. Firstly, HFOs are very expensive refrigerants/foam blowing agents, and, secondly, HFOs may have relatively low solubility in polystyrene as compared with conventional blowing agents such as HFC 134a, thus making it difficult to achieve desired insulation properties in the resulting foam product. Additionally, polystyrene do not typically exhibit favorable foaming behavior when physical blowing agents, such as carbon dioxide, are used. Particularly, when used as a physical blowing agent in traditional polystyrene foam processes, carbon dioxide produces nondescript masses of polymeric material or otherwise poor quality thermoplastic foams that tend to collapse. Without being limited by theory, this may be the result of a lack of polymer-gas compatibility and limited solubility of carbon dioxide within the molten thermoplastic extrudate, which lead to the production of an uncontrollably high level of open cells in the foam structure as the thermoplastic/blowing agent combination exits the die. Additionally, even if the resultant foams have a visible foam structure, the foams tend to collapse quickly due to the relatively high permeability of carbon dioxide relative to air (i.e., the cells can collapse due to the partial vacuum created by the rapid escape of the carbon dioxide from the cells) and become unsuitable for most practical applications within hours of being manufactured. Without wishing to be bound by theory, it is postulated that the presence of the SRA(s) increases the solubility of the blowing agent, thereby improving miscibility in PS, and that the presence of the SRA may reduce the activation energy for the nucleation of bubbles and cell growth due to increased mobility of the polymer chains due to a plasticizing effect. This may result in the production of a large number of cells, thereby yielding lower foam densities, in embodiments.

In embodiments, the PS composition can comprise from about 0.01 to 10.0 weight percent (wt %), from about 0.01 to 5.0 wt %, from about 0.01 to 2.0 wt %, from about 0.1 to 1.0 wt %, or from about 0.01 to 0.50 wt % of the SRA(s), said weight percentages being based on the total amount of PS and the SRA(s) in the PS composition. In embodiments, the PS composition comprises about 0.01, 0.05, 0.1, 0.25, 0.5, 0.75, 1.0, 1.25, 1.5, 1.75, 2.0, 2.25, 2.5, 2.75, 3.0, 3.25, 3.5, 3.75, 4.0, 4.25, 4.5, 4.75, or 5.0 wt % of SRA(s), based on the total weight of PS and the SRA(s) in the PS composition.

In embodiments, the PS composition comprises low levels of mineral oil (MO) and/or epoxidized soybean oil (ESO). Without wishing to be limited by theory, it is speculated that MO and ESO can plasticize PS melt to a certain degree, effectively improving "free volume" by increasing the mobility of the polymer chain segments. The polar species of the ESO may expedite the diffusivity of polar blowing agent molecules throughout a PS melt. The addition of ESO to PS to produce a PS composition of this disclosure may thus allow PS to be foamed at relatively low temperatures with high blowing agent concentrations, in embodiments. As the presence of MO and/or ESO may detrimentally affect foam mechanical properties, such as melt strength of polystyrene, which could, if significant, result in undesirable collapsed cells, PS compositions comprising such SRA(s) may be fine-tuned to achieve an optimal balance of blowing agent solubility improvement and melt strength. For example, in embodiments, strengtheners, such as, without limitation, high stiffness poly(phenylene oxide) (PPO), polyalphamethyl styrene, or combinations may be added to the PS composition to achieve a desired foam compression strength.

Although described with reference to an epoxidized soybean oil, in embodiments, an SRA of this disclosure may comprise any of a wide variety of epoxidized fatty acids and esters. For example, in embodiments, the epoxidized fatty acid can be selected from the following fatty acids: myristic acid, myristoleic acid, palmitic acid, palmitoleic acid, margaric acid, margaroleic acid, stearic acid, oleic acid, linoleic acid, linolenic acid, arachidic acid, gadoleic acid, eicosadienoic acid, behenic acid, erucic acid, lignoceric acid or combinations thereof. Such fatty acids can be found in a variety of vegetable oils including, but not limited to, linseed oil, tung oil, safflower oil, soybean oil, castor oil, cottonseed oil, peanut oil, rapeseed oil, coconut oil, palm oil, olive oil, corn oil, corn germ oil, sesame oil, peach seed oil, peanut oil, soybean lecithin, and egg yolk lecithin. Thus, a variety of epoxidized fatty acids can be used in a PS composition according to this disclosure. In embodiments, the SRA comprises an acrylated epoxidized fatty acid, as described, for example, in U.S. Pat. No. 8,648,122, the disclosure of which is hereby incorporated herein in its entirety for purposes not contrary to this disclosure.

In embodiments, the SRA comprises mineral oil (MO). As utilized herein, MO can be any light mixture of alkanes from a mineral source, for example, a distillate of petroleum, and includes mixtures of mineral oil from different sources or processes. The MO may be a liquid by-product of the refining of crude oil, for example.

In embodiments, the SRA comprises epoxidized polybutadiene. The epoxidized polybutadiene comprises epoxy groups (or 'oxirane oxygen' groups) on the polymer backbone. In embodiments, the epoxidized polybutadiene can comprise from about 0.01% to about 5.0%, from about 0.01% to about 2.0%, or from about 0.01% to about 1.0% percent oxirane oxygen. In embodiments, the epoxidized polybutadiene can have an epoxy value, as measured by ASTM D1652, in the range of from about 0.1 to about 5.0 meq/g, from about 0.5 to about 3.0 meq/g, or from about 1.0 to about 2.0 meq/g. In embodiments, the molecular weight of epoxidized polybutadiene ranges from 800 to 10,000.

In embodiments, the SRA comprises glycerol monostearate (GMS). In embodiments, a PS composition of this disclosure comprises glycerol tristearate (GTS), which is more bulky than GMS, and may, in embodiments, impart particularly beneficial properties to PS foams.

In embodiments, the SRA(s) enhance blowing agent solubility in PS for foam extrusion. In embodiments, the SRA(s) enhance the solubility of the blowing agent in the foamable mixture by at least 5, 7, 10, or 20% over the solubility of the blowing agent in a foamable mixture absent the additive.

The PS composition of this disclosure comprises polystyrene. Various polystyrene homopolymers and copolymers can be used, as well as high impact polystyrenes (HIPS) constructed through polymerization or irradiation techniques. In embodiments, the PS can comprise crystal polystyrene (also referred to as general purpose polystyrene (GPPS)), high impact polystyrene (HIPS), PS copolymers, or a combination thereof. In embodiments, the polystyrene copolymer may contain a metallic monomer. For example, in embodiments, the metallic monomer comprises zinc dimethylacrylate (ZDMA). Suitable polystyrene copolymers can include a wide variety of polymers, such as, but not limited to, glycidyl methacrylate, 2-hydroxylethyl methacrylate copolymers, acrylonitrile, etc. In embodiments, suitable polystyrene can be derived from petroleum-based resources and/or bio-based resources.

In embodiments, the polystyrene of the herein-disclosed PS composition has a melt flow rate (MFR), as measured by D1238, in the range of from 0.2 to 30 grams (g)/10 minutes (min), from 1.0 to 20 g/10 min, or from 1.0 to 10.0 g/10 min.

In embodiments, the PS composition of this disclosure comprises crystal polystyrene. The crystal PS may be characterized by a melt flow rate of from 0.2 g/10 min to 30 g/10 min, from 1.0 g/10 min to 20 g/10 min, or from 1.0 g/10 min to 10.0 g/10 min, as determined in accordance with ASTM D-1238; a tensile strength of from 6,000 psi to 8,000 psi (from 41.4 to 55.2 MPa), from 6,500 psi to 8,000 psi (from 44.8 to 55.2 MPa), or from 7,000 psi to 8,000 psi (from 48.3 to 55.2 MPa), as determined in accordance with ASTM D-638; a tensile modulus of from 400,000 psi to 480,000 psi (from 2.8 to 3.3 GPa), from 420,000 psi to 460,000 psi (from 2.9 to 3.2 GPa), or from 430,000 psi to 450,000 psi (from 3.0 to 3.1 GPa), as determined in accordance with ASTM D-638; a flexural modulus of from 400,000 psi to 480,000 psi (from 2.8 to 3.3 MPa), from 420,000 psi to 460,000 psi (from 2.9 to 3.2 MPa), or from 430,000 psi to 450,000 psi (from 3.0 to 3.1 MPa), as determined in accordance with ASTM D-790; a flexural strength from 10,000 psi to 15,000 psi (from 68.9 to 103.4 MPa), from 12,000 psi to 14,000 psi (from 82.7 to 96.5 MPa), or from 13,000 psi to 14,000 psi (from 89.6 to 96.5 MPa), as determined in accordance with ASTM D-790; an annealed heat distortion of from 190° F. to 220° F. (from 87.8° C. to 104.4° C.), from 200° F. to 220° F. (from 93.3° C. to 104.4° C.), or from 210° F. to 220° F. (from 98.9° C. to 104.4° C.), as determined in accordance with ASTM D-648; and/or a Vicat softening of from 200° F. to 230° F. (from 93.3° C. to 110.0° C.), from 210° F. to 230° F. (from 98.9° C. to 110.0° C.), or from 215° F. to 225° F. (from 101.7° C. to 107.2° C.), as determined in accordance with ASTM D-1525.

In embodiments, the PS composition of this disclosure comprises HIPS. HIPS refers to any elastomer-reinforced vinylaromatic polymers. The vinylaromatic monomers may include, but are not limited to, styrene, alpha-methylstyrene and ring-substituted styrene. HIPS may further include comonomers, including methylstyrene; halogenated styrenes; alkylated styrenes; acrylonitrile; esters of (meth) acrylic acid with alcohols having from 1 to 8 carbons; N-vinyl compounds such as vinyl-carbazole, maleic anhydride; compounds which contain two polymerizable double bonds such as divinylbenzene or butanediol diacrylate; or combinations thereof. The comonomer may be present in an amount effective to impart one or more user-desired properties to the polystyrene resin. Such effective amounts may be determined by one of ordinary skill in the art with the aid of this disclosure. For example, the comonomer may be present in the styrenic polymer composition in an amount of from 1 wt. % to 99.9 wt. % by total weight of a reaction mixture from which the polystyrene is formed, from 1 wt. % to 90 wt. %, or from 1 wt. % to 50 wt. %.

Within the HIPS, the elastomeric material is typically embedded in the polystyrene matrix. Examples of elastomeric materials include conjugated diene monomers, including, without limitation, 1,3-butadiene, 2-methyl-1,3-butadiene, 2-chloro-1,3 butadiene, 2-methyl-1,3-butadiene, or combinations thereof. In embodiments, the HIPS comprises an aliphatic conjugated diene monomer as the elastomer. Without limitation, examples of suitable aliphatic conjugated diene monomers include C4 to C9 dienes, such as butadiene monomers. Blends or copolymers of the diene monomers may also be utilized. Likewise, mixtures or blends of one or more elastomers may be used to produce the HIPS. In embodiments, the elastomer comprises a homopolymer of a diene monomer; in embodiments, the elastomer comprises polybutadiene. The elastomer may be present in the HIPS in amounts effective to produce one or more user-desired properties. Such effective amounts may be determined by one of ordinary skill in the art with the aid of this disclosure. For example, the elastomer may be present in the HIPS product in an amount of from 1 wt. % to 20 wt. %, from 2 wt. % to 15 wt. %, or from 5 wt. % to 11 wt. %, based on the total weight of the HIPS.

In embodiments, a HIPS utilized in a PS composition of this disclosure has a melt flow rate of from 1 g/10 min. to 40 g/10 min., from 1.5 g/10 min. to 20 g/10 min., or from 2 g/10 min. to 15 g/10 min., as determined in accordance with ASTM D-1238; a falling dart impact of from 5 in-lb to 200 in-lb (from 0.6 to 22.6 N-m), from 50 in-lb to 180 in-lb (from 5.6 to 20.3 N-m), or from 100 in-lb to 150 in-lb (from 11.3 to 16.9 N-m), as determined in accordance with ASTM D-3029; an Izod impact of from 0.4 ft-lbs/in to 5 ft-lbs/in (from 0.4 to 267 J/m), from 1 ft-lbs/in to 4 ft-lbs/in (from 53 to 213 J/m), or from 2 ft-lbs/in to 3.5 ft-lbs/in (from 107 to 187 J/m), as determined in accordance with ASTM D-256; a tensile strength of from 2,000 psi to 10,000 psi (from 13.8 to 68.9 MPa), from 2,800 psi to 8,000 psi (from 19.3 to 55.1 MPa), or from 3,000 psi to 5,000 psi (from 20.7 to 34.5 MPa), as determined in accordance with ASTM D-638; a tensile modulus of from 100,000 psi to 400,000 psi (from 0.7 to 2.7 GPa), from 200,000 psi to 400,000 psi (from 1.4 to 2.7 GPa), or from 250,000 psi to 380,000 psi (from 1.7 to 2.6 GPa), as determined in accordance with ASTM D-638; an elongation of from 0.5% to 90%, from 5% to 70%, or from 35% to 60%, as determined in accordance with ASTM D-638; a flexural strength of from 3,000 psi to 15,000 psi (from 20.7 to 103.4 MPa), from 4,000 psi to 10,000 psi (from 27.6 to 68.9 MPa), or from 6,000 psi to 9,000 psi (from 41.4 to 62.1 MPa), as determined in accordance with ASTM D-790; a flexural modulus of from 200,000 psi to 450,000 psi (from 1.4 to 3.1 GPa), from 230,000 psi to 400,000 psi (from 1.6 to 2.8 GPa), or from 250,000 psi to 350,000 psi (from 1.7 to 2.4 GPa), as determined in accordance with ASTM D-790; an annealed heat distortion of from 180° F. to 215° F. (from 82° C. to 102° C.), from 185° F. to 210° F. (from 85° C. to 99° C.), or from 190° F. to 205° F. (from 88° C. to 96° C.), as determined in accordance with ASTM D-648; a Vicat softening of from 195° F. to 225° F. (from 91° C. to 107° C.), from 195° F. to 220° F. (from 91° C. to 104° C.), or from 200° F. to 215° F. (from 93° C. to 102° C.), as determined in accordance with ASTM D-1525; and/or a gloss 60° of from 30 to 100, from 40 to 98, or from 50 to 95, as determined in accordance with ASTM D-523.

In embodiments, the PS of a PS composition of this disclosure further comprises one or more additives to impart desired physical properties, such as, increased gloss or color, etc. Examples of additives include, without limitation, stabilizers, talc, antioxidants, UV stabilizers, lubricants, plasticizers, ultraviolet screening agents, oxidants, anti-oxidants, anti-static agents, ultraviolet light absorbents, fire retardants, processing oils, mold release agents, coloring agents, pigments/dyes, fillers, and the like. The aforementioned additives may have been used either singularly or in combination to form the PS of the PS composition (or may be added to a PS composition of this disclosure separately from the PS of the composition). For example, stabilizers or stabilization agents may have been employed to help protect the polymeric composition from degradation due to exposure to excessive temperatures and/or ultraviolet light during formation of the PS. The additives may have been added after recovery of the PS, for example during compounding such as pelletization. These additives may be included in amounts effective to impart the desired properties. Effective additive amounts and processes for inclusion of these additives to polymeric compositions to produce a PS for use in a PS composition of this disclosure are known to one skilled in the art. For example, the additives may be present in the PS or PS composition in an amount of from 0.1 wt. % to 5 wt. %, alternatively from 0.1 wt. % to 2 wt. %, alternatively from 0.1 wt. % to 1.0 wt. % based on the total weight of the PS composition or a polymeric composition from which the PS of the PS composition of this disclosure is produced.

As noted above, various additives can be included within the PS composition. In embodiments, a PS composition of this disclosure further comprises an additive in addition to the SRA(s) and the PS (i.e., in addition to any additives utilized during formation of the polystyrene and introduced separately from the polystyrene and the SRA(s)). In embodiments, for example, it can be desirable to include a foaming nucleating agent (e.g., a chemical blowing agent as foaming nucleators, zinc oxide, zirconium oxide, silica, talc, and the like) and/or an aging modifier (e.g., a fatty acid ester, a fatty acid amide, a hydroxyl amide, and the like). Other additives that can be employed include pigments, colorants, fillers, stability control agents, antioxidants, flame retardants, stabilizers or costabilizers (e.g. thioethers, phosphites, phosphonites, light stabilizers and other functional stabilizers), fragrances, odor masking agents, antistatic agents, lubricants, foaming aids, coloring agents, deterioration inhibitors, and the like. Such additives are well known to those of ordinary skill in the art. In embodiments, a PS composition of this disclosure comprises an additive (in addition to the PS and SRA(s)) selected from antioxidants, flame retardants, IR attenuators foaming nucleators or a combination thereof. In embodiments, a PS composition of this disclosure comprises the antioxidant IRGANOX® 1010 (pentaerythritol tetrakis(3-(3,5-di-tert-butyl-4-hydroxyphenyl)propionate)). As noted above, in embodiments, one or more additional additives, such as, without limitation, strengtheners (e.g., PPO, polyalphamethyl styrene, etc.) are employed to improve foam mechanical properties. The additives can also be used in the form of masterbatches, in embodiments.

A PS composition of this disclosure can further comprise a blowing agent. In embodiments, any chemical or physical blowing agent can be used. Chemical foaming agents typically decompose at polymer melting conditions. For example, a sodium bicarbonate and citric acid mixture is commonly used to nucleate fine cells. Chemical foaming agents typically decompose between about 100° C. to about 140° C. to yield at least one gas, such as carbon dioxide, and water. In addition, solid particles can potentially act as nucleation sites. Once the nucleated bubble reaches a critical size, it grows continuously due to gas diffusion inside the cells until the bubble stabilizes to reach the final stage. Suitable chemical blowing agents are known to those of skill in the art. In embodiments, the blowing agent can be a physical blowing agent. Physical blowing agents can be further classified into two categories, including gases and volatile liquids. Gaseous physical blowing agents can include, but are not limited to, carbon dioxide, nitrogen, argon, air, helium, hydrogen, xenon, sulfur hexafluoride, nitrous oxide, ammonia, silicon tetrafluoride, nitrogen tetrafluoride, boron tetrafluoride, boron trichloride, or combinations thereof. Thus, in embodiments, the blowing agent can be carbon dioxide. Volatile liquid physical blowing agents can include, but are not limited to, liquids, such as water, and aliphatic or linear hydrocarbons.

In embodiments, the blowing agent is selected from hydrofluorocarbons (HFCs), hydrofluoroolefins (HFOs), or a combination thereof. In embodiments, the blowing agent further comprises one or more selected from hydrocarbons, carbon dioxide, nitrogen, or a combination thereof.

The disclosed PS composition can have a wet density, as measured by ASTM C578, of less than or equal to about 0.09 g/mL (5.6 pounds per cubic foot ("pcf")). In embodiments, the disclosed PS composition can have a wet density ranging from about 0.03 to about 0.09 g/mL (from about 1.9 to about 5.6 pcf), from about 0.03 to about 0.085 g/mL (from about 1.9 to about 5.5 pcf), from about 0.03 to about 0.08 g/mL (from about 1.9 to about 5.0 pcf).

Also disclosed herein is a low density polystyrene (PS) foam produced via extrusion of a PS composition of this disclosure. In embodiments, the low density PS foam exhibits at least one superior insulative property relative to that of an otherwise similar low density foam that does not contain the SRA(s). The at least one superior insulative property can comprise an R-value, as determined by ASTM C518. In embodiments, the low density PS foam exhibits at least one mechanical property that is at least comparable to that of an otherwise similar low density foam that does not contain the SRA(s). In embodiments, the at least one mechanical property can be the compressive strength (as measured by ASTM D3574-C). In embodiments, a low density polystyrene (PS) foam produced via extrusion of a PS composition of this disclosure comprising a blowing agent comprising one or more hydrofluoroolefins exhibits at least one insulative property that is at least equivalent to that of an otherwise similar low density foam produced in the absence of the SRA(s) and with one or more blowing agents selected from hydrofluorocarbons (HFCs).

Without wishing to be limited by theory, the SRA(s) may serve as a permeation barrier within the resulting polystyrene foam of this disclosure, thus reducing the permeation rate of blowing agent through the cell walls of the foam. The low density polystyrene foam of this disclosure may thus exhibit an increased retention of the blowing agent subsequent formation of the foam, for example, after a time of 15, 30, or 60 days. In embodiments, the low density polystyrene foam of this disclosure exhibits a blowing agent retention, as determined, for example, by GC headspace technique as described in Example 3 hereinbelow, that is at least 10, 15, or 20% greater than that of an otherwise similar polystyrene foam produced in the absence of the SRA(s).

The disclosed low density polystyrene foam can have any desired thickness to suit an intended application. For example, in embodiments, the disclosed polystyrene foam can be in the form of a sheet or plank having a thickness ranging from about 1/32 inch to about 2.0 inches. However, thinner or thicker foams are also included within the scope of the herein-disclosed subject matter. The low density polystyrene foam can have any desired density, such as, but not limited to, a wet density, as measured by ASTM C578, of less than or equal to about 0.09 g/mL (5.6 pounds per cubic foot ('pcf')). In embodiments, the low density polystyrene foam can have a wet density ranging from about 0.02 to about 0.09 g/mL, from about 0.03 to about 0.08 g/mL, from about 0.04 to about 0.08 g/mL, or from about 0.04 to about 0.06 g/mL.

In embodiments, the disclosed polystyrene foam can have an average cell size of at least about 50 microns. In embodiments, the disclosed foam can have an average cell size of at most about 1000 microns. The average cell size can be measured in accordance with ASTM D3576-98 (Procedure A).

The disclosed polystyrene foam can take any of a wide variety of configurations, such as, but not limited to, sheets, plank, slabs, blocks, boards, rods, beads, and molded shapes.

Methods of Making the Disclosed Polystyrene Foam

The disclosed polystyrene foam can be constructed using any of the processes known in the art. In embodiments, any chemical or physical blowing agent, as described above, can be utilized. As will be apparent to those having ordinary skill in the art, blowing agents work by expanding a thermoplastic resin to produce a cellular thermoplastic structure having substantially less density than the resin from which the foam is made. Bubbles of gas form around 'nucleation sites' and are expanded by heat or reduced pressure or by a process of chemical reaction in which a gas is evolved. A nucleation site is a small particle or conglomerate of small particles that promotes the formation of a gas bubble in the resin. In embodiments, one or more additives can be incorporated into the resin to promote nucleation for a particular blowing agent and thereby provide for a more uniform pore distribution.

The total amount of blowing agent in the PS composition used to prepare the disclosed PS foam structures depends on conditions such as the temperature and pressure under which the blowing agent is dissolved in the polymer, the chemical and thermophysical characteristics of the blowing agent used, and the desired density and associated properties (such as insulation value, weight-to-strength ratio, compressive strength, etc.) of the resulting foamed article. Thus, in embodiments, the blowing agent can be mixed with the PS composition or blend in an amount suitable to achieve a desired degree of expansion in the resultant PS foam. For example, in embodiments, the blowing agent can be added to the PS blend in an amount ranging from about 0.5 to about 15 parts by weight; in embodiments, from about 2 to 10 parts by weight; and in embodiments, from about 3 to 9 parts by weight, based on 100 parts by weight of the PS composition or foamable mixture.

In embodiments, the disclosed polystyrene foam can be constructed using a continuous extrusion process. In this method the polystyrene and SRA(s) of the PS composition are blended together and added to an extruder. In embodiments, SRA(s) can be added in a masterbatch form. Any conventional type of extruder can be used, e.g., single screw, double screw, and/or tandem extruders. In the extruder, the PS blend is melted and mixed. The blowing agent is added to the melted polystyrene/SRA blend through one or more injection ports in the extruder. Any additional additives that are to be used can be added to the melted polystyrene/SRA blend in the extruder and/or can be added with the PS resin pellets, as noted hereinabove. The extruder pushes the entire melt mixture (melted PS/SRA blend, blowing agent, and any additional additives) through a die at the end of the extruder and into a region of reduced temperature and pressure relative to the temperature and pressure within the extruder. Any of a wide variety of dies can be used, including, but not limited to, strand, annular, flat, coextruded, and microlayered dies. In embodiments, the region of reduced temperature and pressure can be at ambient atmosphere. The sudden pressure drop due to polymer filled with gas as it exits the die results in thermodynamic instability. The nucleating agents generate a large number of bubbles and grow due to the diffusion of vaporized gas into growing cells. The foam continues to expand until the cells grow and stabilize. The foam surface solidifies upon cooling of the polymer mass, due to the reduction in temperature, thereby trapping the blowing agent within the cells. An extruded polystyrene foam is thereby formed.

Alternatively, in embodiments, the disclosed polystyrene foam can be constructed using a batch process. In such embodiments, the polystyrene blend (i.e., PS and SRA(s)) and any desired additional additives are added to a container, such as a pressure chamber. The container is heated to a specified temperature or temperature range sufficient to plasticize the polystyrene resin. The blowing agent is then added into the container to a specified pressure or pressure range, allowing the blowing agent to penetrate the polystyrene resin over a period of time. The pressure is rapidly relieved, thereby allowing the resin to expand into a foam.

The presently disclosed subject matter also includes additional methods of foaming, including, but not limited to, solid state foaming, integral skin foaming, microcellular foaming, autoclave foaming, and semi-continuous foaming processes. Such methods are well known to those of ordinary skill in the foaming art. In embodiments, the SRAs may be added as masterbatches into otherwise conventional polystyrene formulations.

Methods of Using the Disclosed Foam

As set forth herein, the presently disclosed methods can be used to construct a polystyrene foam using a physical blowing agent (such as carbon dioxide). Depending on the materials and process used, the resulting foam article can be a bead, sheet, board, plank, rods, tubes, contoured members, or the like. The disclosed polystyrene foam can be used as such, cut into other shapes, further shaped or thermoformed by application of heat and/or pressure, or otherwise machined or formed into articles of desired size and shape, as would be well known to those of ordinary skill in the packaging art.

The disclosed polystyrene foams can be used for any of a wide variety of purposes. For example, in embodiments, the disclosed polystyrene foam can be used for insulation, in various container and packaging systems, and/or as protective or flexible packaging. Thus, in embodiments, the disclosed polystyrene foam can be thermoformed into containers, such as, but not limited to, trays, bowls, and/or plates, used in flexible and rigid packaging, used in a variety of protective packaging applications, used in loose fill packaging, and/or can be molded as sheets, planks, boards, or contoured articles for flexible, protective, rigid, and/or insulative applications.

Features and Potential Advantages of the Herein Disclosed PS Compositions Comprising SRA(s), Methods of Producing PS Foams Therefrom, and PS Foams Thus Produced As noted hereinabove, the herein-disclosed PS composition and method of producing a PS foam therefrom may enable greater solubility of blowing agent(s) in PS during extrusion and/or a higher concentration of blowing agent(s) in the resulting PS foam. The incorporation of a greater concentration of blowing agent(s) in the resultant polystyrene foam may provide for enhanced insulative properties thereof.

Additionally, it has been found that when PS is blended with an SRA of this disclosure, it can be foamed in the presence of a physical blowing agent, such as carbon dioxide. In embodiments, the non-flammability and/or low GWP of the blowing agent allows for improved safety and/or environmental friendliness relative to conventional flammable or high GWP hydrocarbons. The use of a physical blowing agent may also help to reduce the curing time of the foam, which may save time, effort, and money.

EXAMPLES

The embodiments having been generally described, the following examples are given as particular embodiments of the disclosure and to demonstrate the practice and advantages thereof. It is understood that the examples are given by way of illustration and are not intended to limit the specification or the claims in any manner.

Example 1: Extrusion of PS in the Presence of ESO

An inventive PS composition IC1 was formed from a crystal polystyrene PS1 CX5197 (commercial name now PS 533) having a MFR of 4.5 g/10-min compounded in the presence of 5000 ppm (0.5 wt %) ESO through a 27 mm twin screw extruder. The inventive composition was dry blended with 0.5 wt % chemical blowing agent FP-40 as the foaming nucleator and evaluated for foam extrusion utilizing varying amounts of HFC 134a (also referred to as R134a) as the blowing agent. A comparative composition CC1 comprising the standard crystal polystyrene PS1 having the MFR of 4.5 g/10 min and no ESO was similarly processed. The formulations were compounded on a single screw extruder. Sample 1 was a 100% PS533 (Total PS grade with a 4.5 melt flow rate available from Total Petrochemicals and Refining USA, Inc.). Sample 2 was a PS 533 compound containing 0.5% ESO (VIKOFLEX® 7170, available from Arkema). Specifically, a blend of each sample was placed in the hopper of a single screw extruder under the following conditions: temperature of 180° C. to 200° C. The resulting strand was fed through a water bath to cool and then dried with an air knife. The strand was then fed into a KILLION® pelletizer.

Samples 1 and 2 from Example 1 were foamed in a tandem foam extrusion line. Specifically, the samples were placed in the hopper of the primary extruder. The blowing agent 134a was fed into the primary extruder through a MaxPro liquid pump. The homogenized melt was fed into the secondary extruder through a Nordson Xaloy melt pump. The secondary extruder temperatures were adjusted to maintain a constant die head pressure of 1200 psi. As the melt exited the 20 mil ribbon die, low density foams were produced.

The wet densities of inventive composition IC1 and comparative composition CC1 were determined by ASTM C578, which is hereby incorporated by reference. FIG. 1 is a plot of wet density (g/cc) as a function of the concentration (wt %) of blowing agent HFC 134a for the IC1 and CC1 of Example 1. As seen in FIG. 1, the experimental data show that the inventive composition IC1 containing the 4.5 g/10-min MFR PS1 and approximately 0.5 wt % ESO had a wet density reduced by an average of over 10% at concentrations between 7 and 8 wt % HFC 134a compared to the CC1 control.

FIG. 2 is a plot of secondary extrusion temperature (° F.) as a function of the concentration (wt %) of blowing agent HFC 134a for the IC1 and CC1 of Example 1. As seen in the data of FIG. 2, the presence of ESO enabled operation of the secondary extruder at lower temperatures at high blowing agent concentrations. Therefore, IC1 can be used to make lower density foams at desirable higher blowing agent (e.g., HFC 134a) concentrations.

The resulting PS foams, IF1 AND CF1, produced utilizing inventive composition IC1 and comparative composition CC1, respectively, were evaluated for mechanical properties. Modulus was determined by ASTM D3574-C. FIG. 3A is a bar graph of the compressive modulus (psi) for the inventive PS foam IF1 produced utilizing inventive composition IC1 and the comparative PS foam CF1 produced utilizing comparative composition CC1. FIG. 3B is a bar graph of the load at yield ($lb_f$) for inventive PS foam IF1 and comparative PS foam CF1. As seen from the data in FIG. 3A, the addition of 0.5 wt % ESO resulted in an approximately 10% decrease in the foam modulus; as seen from the data in FIG. 3B, the presence of 0.5 wt % ESO resulted in a slight decrease (e.g., by less than 4%) in the compressive strength. Compositions can be formulated and optimized to achieve a balance of the improvement in the solubility of the blowing agent (e.g., HFC 134a) and retention of mechanical properties of the resulting PS foam.

Example 2: Extrusion of PS in the Presence of MO

Figure 5:
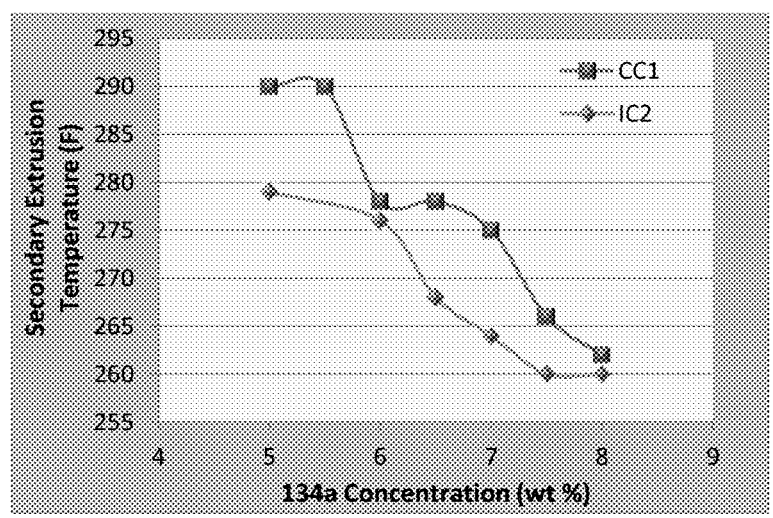
FIG. 5 is a plot of secondary extrusion temperature (° F.) as a function of the concentration (wt %) of blowing agent HFC 134a for compositions of Example 2.

Foam extrusion of an inventive composition IC2 comprising the 4.5 g/10-min MFR crystal polystyrene PS1 of Example 1 and 0.5 wt % mineral oil (MO) as the plasticizer/additive was studied as described in Example 1. FIG. 4 is a plot of wet density (g/cc) as a function of the concentration (wt %) of blowing agent HFC 134a for the inventive composition IC2 of this Example and CC1 of Example 1. FIG. 5 is a plot of secondary extrusion temperature (° F.) as a function of the concentration (wt %) of blowing agent HFC 134a for IC2 and CC1. As seen in the data of FIGS. 4 and 5, similar benefit for blowing agent (i.e., HFC 134a) solubility was obtained utilizing MO as the additive.

Example 3: Extrusion of PS in the Presence of GMS or GTS

Three formulations were investigated employing the crystal polystyrene PS1 having a MFR of 4.5 g/10 min. Comparative composition CC2 comprised neat PS1, third inventive composition IC3 comprised a dry blend of the PS1 with 0.5 wt % GMS, and fourth inventive composition IC4 comprised the PS1 dry blended with 0.5 wt % GTS. Foam extrusion was conducted on a foam line comprising a 0.75" primary extruder and a 1.5" secondary extruder. A 5 mm rod die was used and 0.5 wt % of a talc masterbatch was added as nucleator. R134a was utilized as the blowing agent at increasing concentrations. The head pressure of the secondary extruder was maintained between 1000 and 1200 psi. The throughput was maintained between 6.5 and 7 lbs/hr using the gear pump.

FIG. 6 is a plot of wet density (g/cc), determined as described in Example 1 hereinabove, as a function of the concentration (wt %) of blowing agent R134a for the inventive compositions IC3 and IC4 and comparative composition CC2 of this Example 3. As seen in the data in FIG. 6, the density of the CC2 control was fairly constant between 5.2 and 8.2 wt % blowing agent R134a. Inventive composition IC3 comprising the GMS compound showed slightly improved densities between 5.4 and 6.9 wt % blowing agent R134a. The CC2 control and the IC3 comprising the GMS blend became oversaturated at 7.5 wt % blowing agent R134a, as evident from the frequent blowouts of R134a from the die. Inventive composition IC4 containing GTS had a slightly higher density than the CC2 control and the GMS blend of IC3; however, IC4 showed a significant improvement in the solubility of the blowing agent R134a. Specifically, the GTS blend of IC4 was able to foam at high concentrations (e.g., from 7.5 to 9 wt %) of blowing agent R134a, while maintaining good cell structure and no processing issues.

The foam samples CF2, IF2, and IF3 produced from CC2, IC3, and IC4, respectively, were analyzed for retention of the blowing agent 134a utilizing a GC-head space technique developed internally. Results were obtained after the foams were aged for 15 days and 30 days. FIG. 7A is a plot of the peak abundance of blowing agent 134a in the GC headspace as a function of the concentration of the blowing agent R134a utilized in the composition during extrusion after 15 days; FIG. 7B is a plot of the peak abundance of blowing agent R134a in the GC headspace as a function of the concentration of the blowing agent R134a utilized in the composition during extrusion after 30 days. The graphs of FIGS. 7A and 7B thus show the relative blowing agent R134a contents (represented by GC peak abundance) in the finished foams as a function of the blowing agent R134a concentrations actually injected into the extruder during foam extrusion. It can be seen in FIGS. 7A and 7B that foams IF2 and IF3 produced from PS compositions comprising GMS and GTS, respectively, exhibited improvements in blowing agent retention as compared to the CF2 control produced in the absence of an SRA of this disclosure. The foam samples IF3 produced in the presence of GTS appeared to be superior, as significant improvements in blowing agent retention were achieved at higher concentrations (e.g., 7 to 9 wt %) of blowing agent R134a. It is noted that the other two formulations CC2 and IC3 utilized to produce PS foams CF2 and IF2, respectively, could not be extruded consistently at blowing agent R134a concentrations of 8 wt % and higher due to oversaturation of the blowing agents in PS.

Figure 8:
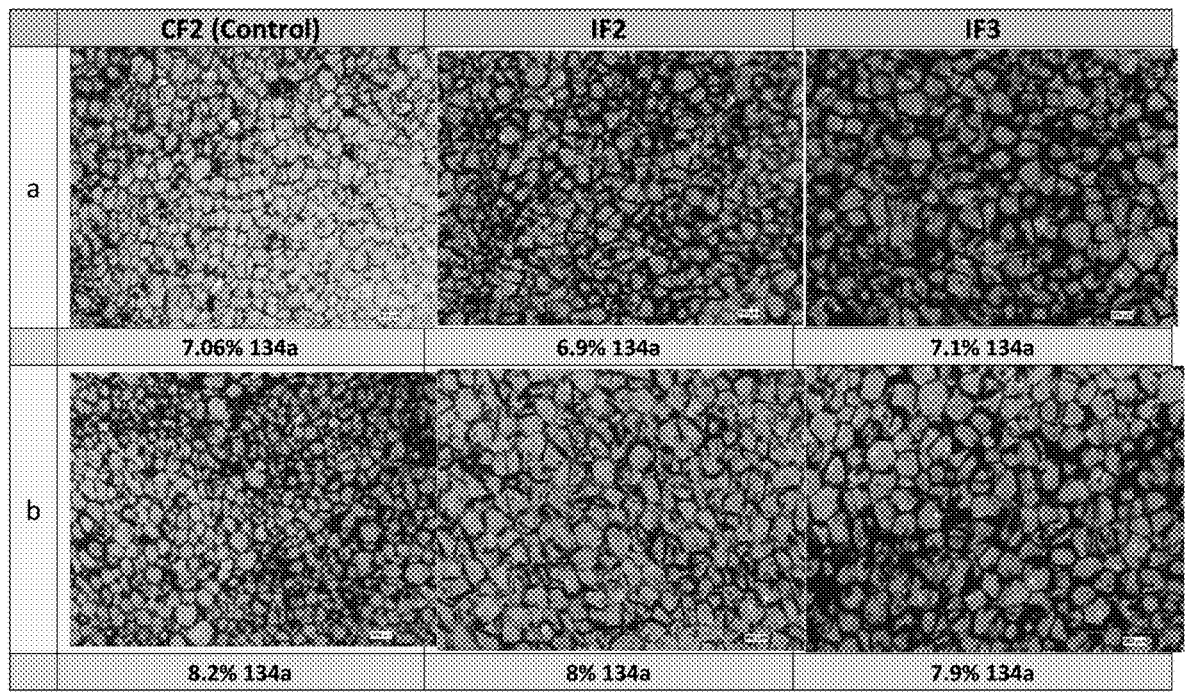
FIG. 8 provides images of foam samples of Example 3.

Images of foam samples CF2, IF2, and IF3 produced utilizing compositions comprising 0 wt % additive, 0.5 wt % GMS, and 0.5 wt % GTS, respectively, were collected utilizing a Leica DM 2500 M microscope at 25× magnification, and are presented in FIG. 8. The top row (a) of FIG. 8 shows images of the CF2, IF2, and IF3 foam samples at 7.06, 6.9, and 7.1 wt % (see a new chart below) blowing agent R134a, respectively, while the bottom row (b) of FIG. 8 shows images of the CF2, IF2, and IF3 foam samples at 8.2, 7.97, and 7.9 wt % blowing agent R134a, respectively. In general, the foam samples IF2 and IF3 produced from PS compositions containing GMS and GTS, respectively, showed an increase in cell size as compared to the neat PS of CF2. In particular foam cells produced from PS compositions comprising GTS were significantly larger than the foam cells produced from the neat PS composition CC2 at equivalent concentrations of blowing agent. Thus, addition of the GMS or GTS additive as per this disclosure may potentially enable elimination or reduction of the amount of other additives that foam producers conventionally utilize to increase foam cell size for optimal insulation properties; this may provide significant cost savings.

PS compositions comprising PS and 0.25 to 0.5% GTS resulted in significant improvements in blowing agent R134a solubility and retention. Overall, production of PS foam from compositions comprising GTS additive as per this disclosure exhibited improvements in solubility of the blowing agent R134a and retention of blowing agent, retaining more blowing agent at higher concentrations thereof, while maintaining relatively low densities and good cell structure. Specifically, the inventive GTS blend composition was able to foam at high concentrations of blowing agent R134a (e.g., 7.5 to 9 wt %), while maintaining good cell structure and no processing issues as compared to the CC2 control which reached a maximum solubility between 6.5 and 7.5 wt % of blowing agent R134a. Furthermore, the PS compositions comprising PS and GTS resulted in PS foams showing significant improvements in R134a retention after 15 and 30 days. An increased solubility and retention of blowing agent R134a in PS foams should improve insulation properties (such as, for example, R-values) for purposes such as the production of insulation foam board.

Example 4: Extrusion of PS in the Presence of GTS Additive and $CO_2$ Blowing Agent $CO_2$ is known to have a very low solubility in polystyrene. Experiments were performed to study the use of carbon dioxide ($CO_2$) as blowing agent. Two samples were foamed utilizing $CO_2$ as blowing agent. Inventive composition IC5 contained the crystal polystyrene PS1 utilized in Example 3 and 0.5 wt % GTS and comparative composition CC3 contained neat polystyrene PS1 in the absence of additive. For IC5, the GTS compound was dry-blended with the crystal polystyrene PS1. A 5 mm rod die was used and 0.5% talc was added as the nucleator. Carbon dioxide was used as the blowing agent at an increasing concentration. The secondary extruder head pressure was maintained between 1100 and 1200 psi. The throughput was maintained at approximately 6.5 lbs/hr using the gear pump.

Figure 9:
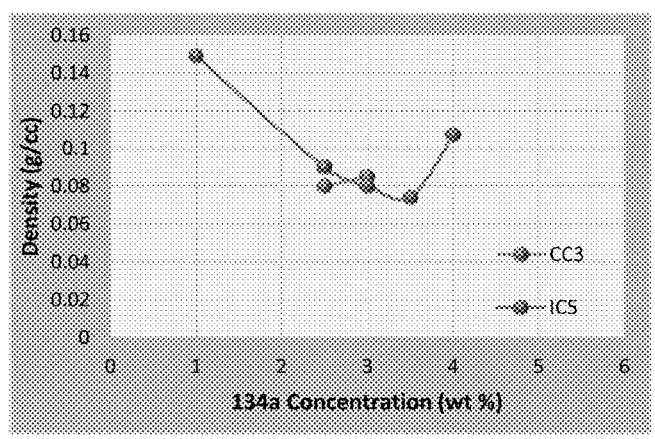
FIG. 9 is a plot of wet density (g/cc) as a function of the concentration (wt %) of carbon dioxide blowing agent for compositions of Example 4.

FIG. 9 is a plot of wet density (g/cc), determined as described in Example 1 hereinabove, as a function of the concentration (wt %) of carbon dioxide blowing agent for the inventive composition IC5 and comparative composition CC3 of this Example. The presence of 5,000 ppm GTS in the PS composition of IC5 was found to increase the $CO_2$ solubility by over about 20% during foam extrusion, which could make $CO_2$ more useful and favorable in certain low density PS foam applications.

The PS1/GTS blend of inventive composition IC5 was foamed with $CO_2$ at a concentration from 1 to 5 wt %. The maximum solubility of the $CO_2$ blowing agent in the PS1/GTS blend of inventive composition IC5 was approximately 3.5% based on foam density and expansion. However, no processing issues or inconsistent cell structures were observed in the sample collected at 4 wt % $CO_2$. Compared to the neat PS1 control CC3, which had a maximum solubility of 3 wt % $CO_2$ blowing agent and showed poor foamability at 4 wt % $CO_2$, this is a significant improvement.

Figures 10A, 10B:
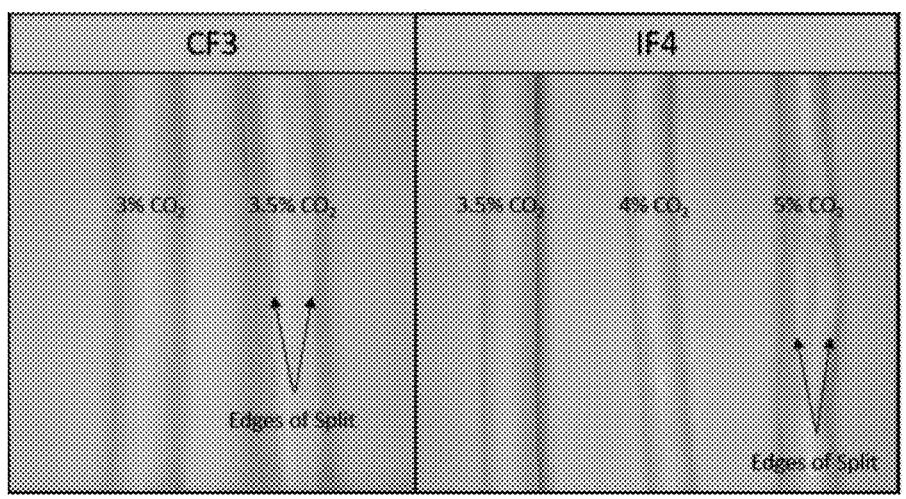
FIGS. 10A and 10B provide images of foams CF3 and IF4, respectively, of Example 4.

Inventive foam IF4 and comparative foam CF3 were produced from inventive PS composition IC5 and comparative PS composition CC3, respectively. FIGS. 10A and 10B provide images of foam rods taken of the comparative foam CF3 and inventive foam IF4. The foam rod samples were collected from different high $CO_2$ levels for both the inventive foams and comparative foams. As shown in the images below, the CF3 resulted in a large slit indicating that $CO_2$ was not retained, while the inventive foam IF4 produced from inventive PS/GTS blend/composition IC5 showed good foamability at 3.5 and 4 wt % $CO_2$. IF4 collected at 5 wt % $CO_2$ showed several slit regions comparable to that of the oversaturated CF3 control sample collected at 3.5 wt % $CO_2$.

Figure 11:
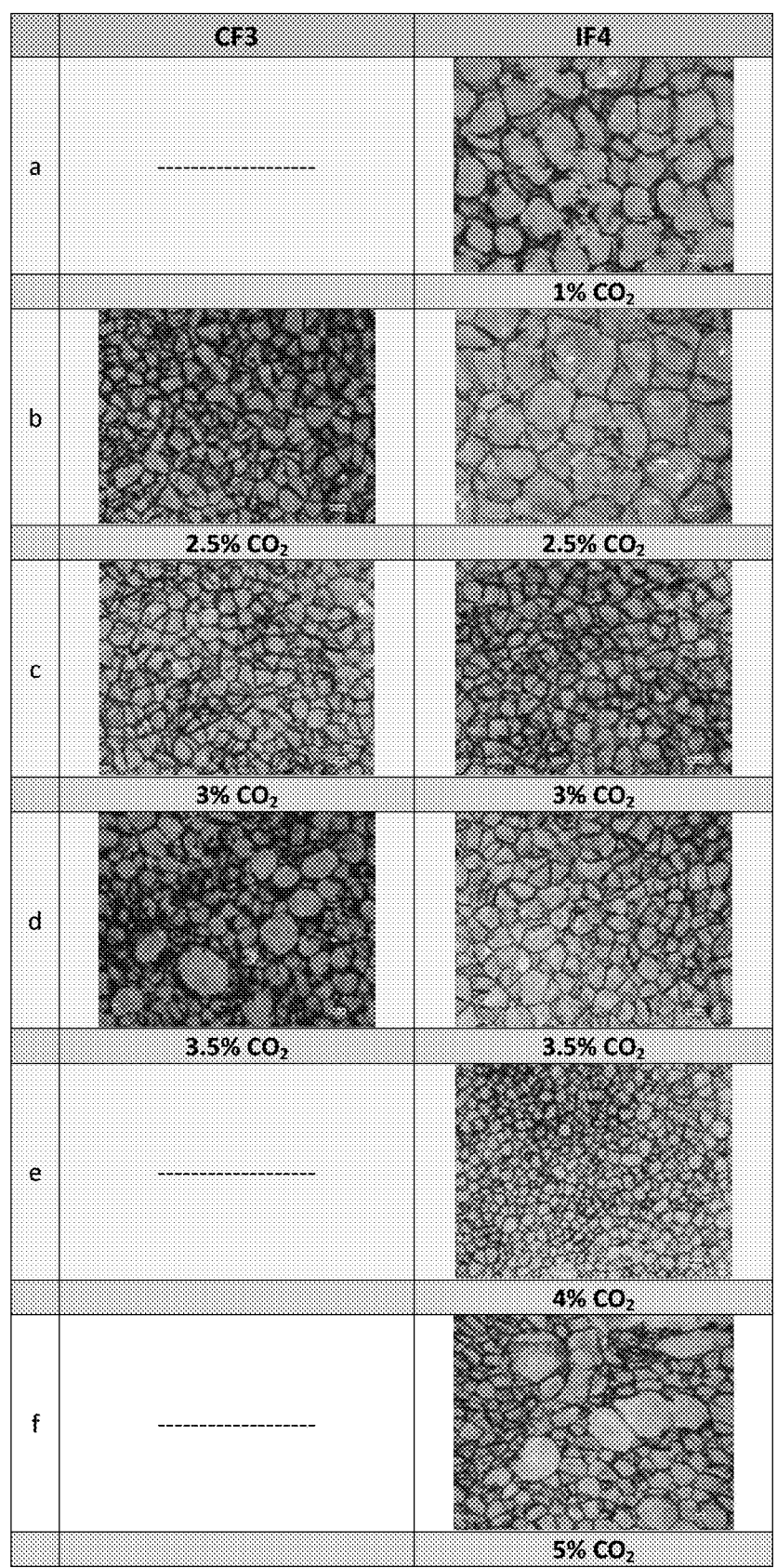
FIG. 11 provides images of the foam samples of Example 4.

Images of foam samples CF3 and IF4 produced utilizing compositions comprising 0 wt % additive and 0.5 wt % GTS, respectively, and varying amounts of carbon dioxide blowing agent were collected utilizing a Leica DM 2500 M microscope at 25× magnification, and are presented in FIG. 11. The first through sixth rows (a) through (f) of FIG. 11 show images of the CF3 and IF4 foam samples at 1, 2.5, 3, 3.5, 4, and 5 wt % carbon dioxide blowing agent, respectively. Overall, the cell structures at each concentration of $CO_2$ correlate with conclusions drawn from the density trends and foam expansion discussed above.

It can be concluded from the experiments of Example 4 that addition of GTS in PS foams not only improves the solubility of HFC 134a as blowing agent, but also improves the solubility of $CO_2$ as blowing agent.

Example 5: PS Foam Extrusion in the Presence of Both GMS and GTS Additives

Evaluation of three PS compositions (PS1 plus 0.5% GMS, PS1 plus 0.5% GTS, and PS1 plus 0.5% IRGANOX 1010) resulted in significant improvements in blowing agent R134a solubility and/or blowing agent R134a retention. Specifically, the composition comprising the PS1/GTS blend was able to foam at high concentrations (i.e., 7.5 to 9 wt %) of blowing agent R134a, while maintaining good cell structure and presenting no processing issues as compared to the PS1 control, which reached a maximum solubility between 6.5 and 7.5 wt % blowing agent R134a. Although the compositions comprising GMS did not increase the maximum solubility of blowing agent R134a in PS1, samples did show improvements in blowing agent R134a retention after 15 and 30 days.

Inventive PS compositions IC6, comprising the crystal polystyrene PS1 (described in Example 3 hereinabove) dry blended with 0.25 wt % GMS and 0.25 wt % GTS, and IC7, comprising PS1 dry blended 0.25 wt % GMS, 0.25 wt % GTS, and 0.25 wt % IRGANOX® 1010, available from BASF, were studied to evaluate the effect of utilizing multiple SRA additives as per this disclosure. The additives were dry-blended with the PS1. A 5 mm rod die was used and 0.5 wt % talc was added as the nucleator. R134a was used as the blowing agent at an increasing concentration. The secondary extruder head pressure was maintained between 1100 and 1200 psi. The throughput was maintained between 6.5 and 7 lbs/hr using the gear pump.

Figure 12:
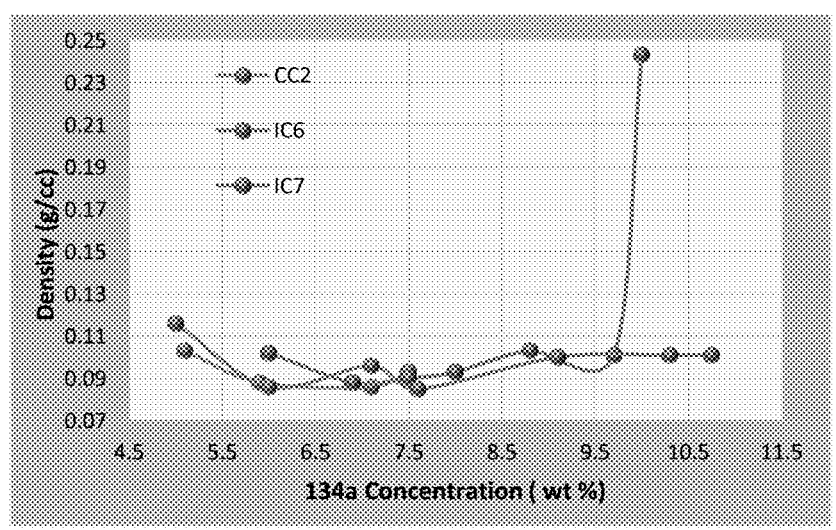
FIG. 12 is a plot of wet density (g/cc) as a function of the concentration (wt %) of HFC 134a blowing agent for compositions of Example 5.

FIG. 12 is a plot of wet density (g/cc), determined as described in Example 1 hereinabove, as a function of the concentration (wt %) of 134a blowing agent for the inventive compositions IC6 and IC7; results for comparative composition CC2 are provided for comparison. As seen in the data of FIG. 12, similar to the results of the PS1 blend containing 0.5 wt % GTS of IC4, inventive composition IC6 comprising the PS1 blended with 0.25 wt % GMS and 0.25 wt % GTS was able to produce relatively low density foam up to 9.7 wt % blowing agent R134a. Additionally, inventive composition IC7 comprising the PS1 blended with 0.25 wt % GMS, 0.25 wt % GTS, and 0.25 wt % IRGANOX® 1010 produced relatively low density foams up to 9.1 wt % blowing agent R134a. Compared to a control (i.e., the CC2 foamed in Example 3) that had a maximum solubility of 6.5 to 7 wt % blowing agent R134a, inventive compositions IC6 and IC7 provided a significant improvement in blowing agent R134a solubility. These results also indicate that a lower loading (e.g., 2500 ppm or less) of an SRA additive according to this disclosure (e.g., GTS) may be sufficient for improving the solubility of blowing agent (e.g., R134a) in PS foams.

Figure 13A:
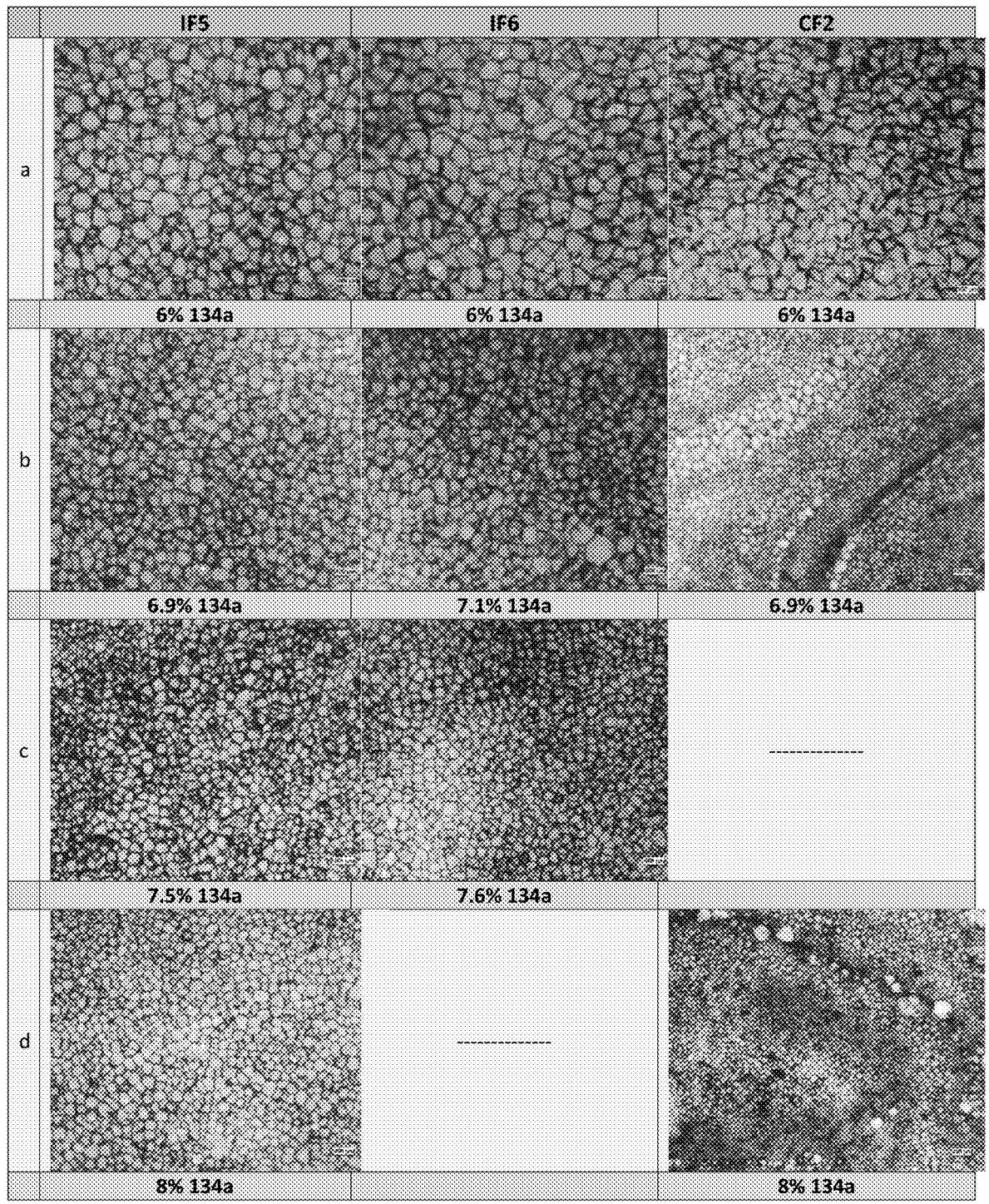
FIGS. 13A and 13B provide images of foam samples of Example 5.
Figure 13B:
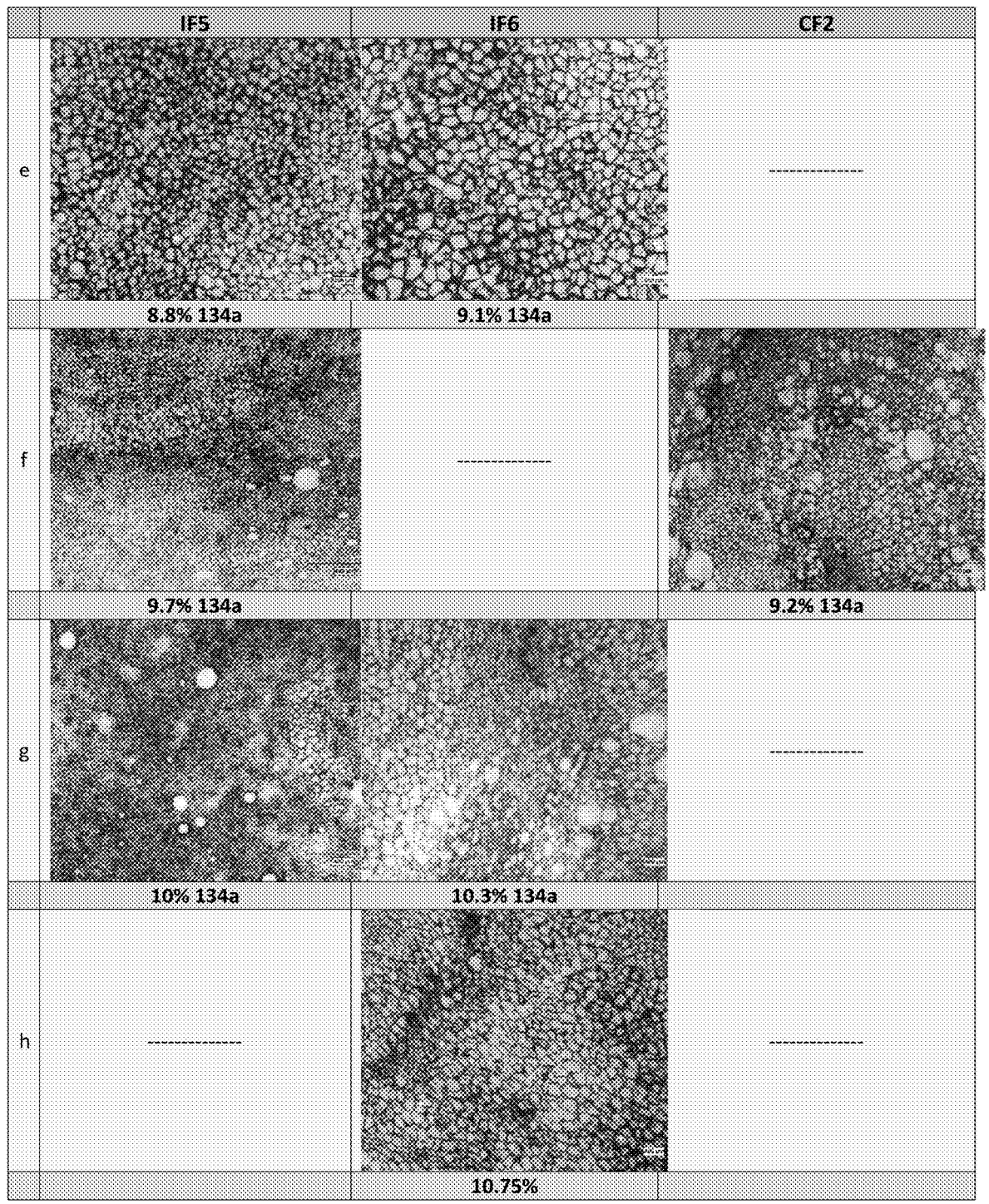

Images of foam samples IF5 and IF6 produced utilizing inventive compositions IC6 and IC7, respectively, and varying amounts of 134a blowing agent were collected utilizing a Leica DM 2500 M microscope at 25× magnification, and are depicted in FIGS. 13A and 13B. Row (a) of FIG. 13A shows images of IF5, IF6, and CF2 at 6 wt % R134a; row (b) of FIG. 13A shows images of IF5, IF6, and CF2 at 6.9, 7.1, and 6.9 wt % R134a, respectively; row (c) of FIG. 13A shows images of IF5 and IF6, at 7.5, and 7.6 wt % R134a, respectively; row (d) of FIG. 13A shows images of IF5 and CF2 at 8 wt % R134a. Row (e) of FIG. 13B shows images of IF5 and IF6 at 8.8 and 9.1 wt % R134a, respectively; row (f) of FIG. 13B shows images of IF5 and CF2 at 9.7 and 9.2 wt % R134a, respectively; row (g) of FIG. 13B shows images of IF5 and IF6, at 10 and 10.3 wt % R134a, respectively; row (h) of FIG. 13B shows an image of IF6 at 10.75 wt % R134a.

The inventive PS foam samples IF5 produced from the inventive composition IC6 comprising PS1 blended with GTS and GMS showed good foamability up to 8.8 wt % blowing agent R134a. Though the sample collected at 9.7 wt % blowing agent R134a had a relatively low foam density, the cell structure images showed areas of inconsistent cell size, suggesting the foam was becoming oversaturated. Images of the inventive PS foam samples IF6 produced from the inventive composition IC7 comprising PS1 blended with GTS, GMS, and IRGANOX® 1010 showed good cell structures from 6 to 9.1 wt % blowing agent R134a. However, the sample collected at 10.3 wt % blowing agent R134a showed a poor cell structure, indicating the maximum solubility was between 9.1 and 10.3 wt % blowing agent R134a.

While various embodiments have been shown and described, modifications thereof can be made by one skilled in the art without departing from the spirit and teachings of the disclosure. The embodiments described herein are exemplary only, and are not intended to be limiting. Many variations and modifications of the subject matter disclosed herein are possible and are within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure. The discussion of a reference is not an admission that it is prior art to the present disclosure, especially any reference that may have a publication date after the priority date of this application. The disclosures of all patents, patent applications, and publications cited herein are hereby incorporated by reference, to the extent that they provide exemplary, procedural, or other details supplementary to those set forth herein.

ADDITIONAL DESCRIPTION

The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Alternative embodiments that result from combining, integrating, and/or omitting features of the embodiment(s) are also within the scope of the disclosure. While compositions and methods are described in broader terms of "having", "comprising," "containing," or "including" various components or steps, the compositions and methods can also "consist essentially of" or "consist of" the various components and steps. Use of the term "optionally" with respect to any element of a claim means that the element is required, or alternatively, the element is not required, both alternatives being within the scope of the claim.

Numbers and ranges disclosed above may vary by some amount. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents, the definitions that are consistent with this specification should be adopted.

Embodiments disclosed herein include:

A: A polystyrene (PS) composition for making an extruded foam, the PS composition comprising: polystyrene; a blowing agent; and an additive selected from glycerol monostearate (GMS), glycerol tri-stearate (GTS), mineral oil (MO), epoxidized soy oil (ESO), epoxidized polybutadiene, or combinations thereof.

B: A low density polystyrene (PS) foam produced via extrusion of a PS composition comprising polystyrene; a blowing agent; and an additive selected from glycerol monostearate (GMS), glycerol tri-stearate (GTS), mineral oil (MO), epoxidized soy oil (ESO), epoxidized polybutadiene, or combinations thereof; wherein the low density PS foam contains a higher blowing agent concentration than that of an otherwise similar low density foam that does not contain the additive.

C: A low density polystyrene (PS) foam produced via extrusion of a PS composition comprising polystyrene; a blowing agent; and an additive selected from glycerol monostearate (GMS), glycerol tri-stearate (GTS), mineral oil (MO), epoxidized soy oil (ESO), epoxidized polybutadiene, or combinations thereof; wherein the low density PS foam exhibits at least one superior insulative property relative to that of an otherwise similar low density foam that does not contain the additive.

D: A low density polystyrene (PS) foam produced via extrusion of a PS composition comprising polystyrene; a blowing agent; and an additive selected from glycerol monostearate (GMS), glycerol tri-stearate (GTS), mineral oil (MO), epoxidized soy oil (ESO), epoxidized polybutadiene, or combinations thereof; wherein the low density PS foam exhibits at least one mechanical property that is at least comparable to that of an otherwise similar low density foam that does not contain the additive.

E: A low density polystyrene (PS) foam produced via extrusion of a PS composition comprising polystyrene; a blowing agent; and an additive selected from glycerol monostearate (GMS), glycerol tri-stearate (GTS), mineral oil (MO), epoxidized soy oil (ESO), epoxidized polybutadiene, or combinations thereof; wherein the blowing agent comprises one or more hydrofluoroolefins, and wherein the low density PS foam exhibits at least one insulative property that is at least equivalent to that of an otherwise similar low density foam produced in the absence of the additive and with one or more blowing agents selected from hydrofluorocarbons (HFCs).

F: A method of producing a low density polystyrene (PS) foam, the method comprising: blending polystyrene (PS), a blowing agent, and an additive selected from glycerol monostearate (GMS), glycerol tri-stearate (GTS), mineral oil (MO), epoxidized soy oil (ESO), epoxidized polybutadiene, or combinations thereof, and optionally other additives, to form a foamable mixture; and producing a foam by extruding the foamable mixture through a die and into a region of reduced pressure.

G: A low density polystyrene (PS) foam produced via a method comprising: blending polystyrene (PS), a blowing agent, and an additive selected from glycerol monostearate (GMS), glycerol tri-stearate (GTS), mineral oil (MO), epoxidized soy oil (ESO), epoxidized polybutadiene, or combinations thereof to form a foamable mixture; and producing a foam by extruding the foamable mixture through a die and into a region of reduced pressure.

H: A method of producing a low density polystyrene (PS) foam, the method comprising: blending polystyrene (PS), a blowing agent, and a masterbatch containing an additive selected from glycerol monostearate (GMS), glycerol tri-stearate (GTS), mineral oil (MO), epoxidized soy oil (ESO), epoxidized polybutadiene, or combinations thereof to form a foamable mixture; and producing a foam by extruding the foamable mixture through a die and into a region of reduced pressure.

Each of embodiments A, B, C, D, E, F, G, and H may have one or more of the following additional elements: Element 1: comprising from about 0.01 to 10.0 weight percent (wt %), from about 0.01 to 5.0 wt %, from about 0.01 to 2.0 wt %, or from about 0.01 to 0.5 wt % of the additive, said weight percentages being based on the total amount of the polystyrene and the additive in the PS composition. Element 2: wherein the PS is selected from crystal polystyrene, high impact polystyrene (HIPS), PS copolymers, or a combination thereof. Element 3: wherein the PS copolymer contains a metallic monomer, glycidyl methacrylate, 2-hydroxylethyl methacrylate, or acrylonitrile. Element 4: wherein the metallic monomer comprises zinc dimethylacrylate (ZDMA). Element 5: wherein the polystyrene has a melt flow rate (MFR), as measured by ASTM D-1238 in the range of from 0.2 to 30 grams (g)/10 minutes (min), from 1 to 20 g/10 min, or from 1 to 10 g/10 min. Element 6: further comprising an additive selected from antioxidants, flame retardants, IR attenuator, foaming nucleators, or a combination thereof. Element 7: wherein the blowing agent is selected from hydrofluorocarbons (HFCs), hydrofluoroolefins (HFOs), or a combination thereof. Element 8: wherein the blowing agent further comprises one or more selected from hydrocarbons, carbon dioxide, nitrogen or a combination thereof. Element 9: wherein the at least one superior insulative property comprises an R-value, as determined by ASTM C518. Element 10: wherein the at least one mechanical property comprises the compressive strength. Element 11: wherein the foamable mixture comprises from about 0.01 to 10.0 weight percent (wt %), from about 0.01 to 5.0 wt %, from about 0.01 to 2.0 wt %, or from about 0.01 to 0.5 wt % of the additive. Element 12: wherein the solubility of the blowing agent in the foamable mixture is at least 5, 7, 10 or 20% greater than the solubility of the blowing agent in an otherwise similar foamable mixture absent the additive. Element 13: wherein the foamable mixture further comprises an additive selected from antioxidants, flame retardants, IR attenuators, foaming nucleators or a combination thereof. Element 14: wherein the low density PS foam contains a higher blowing agent concentration than that of an otherwise similar low density foam produced in the absence of the additive. Element 15: wherein the low density PS foam exhibits at least one superior insulative property relative to that of an otherwise similar low density foam produced in the absence of the additive. Element 16: wherein the low density PS foam exhibits at least one mechanical property that is at least comparable to that of an otherwise similar low density foam produced in the absence of the additive. Element 17: wherein the blowing agent comprises one or more hydrofluoroolefins, and wherein the low density PS foam exhibits at least one insulative property that is at least equivalent to that of an otherwise similar low density foam produced in the absence of the additive and the presence of one or more blowing agents selected from hydrofluorocarbons (HFCs). Element 18: wherein the PS foam exhibits increased retention of the blowing agent after at least 15, 30, or 60 days.

While preferred embodiments of the invention have been shown and described, modifications thereof can be made by one skilled in the art without departing from the teachings of this disclosure. The embodiments described herein are exemplary only, and are not intended to be limiting. Many variations and modifications of the invention disclosed herein are possible and are within the scope of the invention.

Numerous other modifications, equivalents, and alternatives, will become apparent to those skilled in the art once the above disclosure is fully appreciated. It is intended that the following claims be interpreted to embrace all such modifications, equivalents, and alternatives where applicable. Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the detailed description of the present invention. The disclosures of all patents, patent applications, and publications cited herein are hereby incorporated by reference.

What is claimed is:

1. A polystyrene (PS) composition for making an extruded foam having an increased blowing agent concentration and/or blowing agent retention relative to an extruded foam made from a same PS composition absent a solubility and/or retention additive, the PS composition consisting essentially of:
   polystyrene;
   a blowing agent consisting of carbon dioxide;
   the solubility and/or retention additive selected from mineral oil (MO), epoxidized polybutadiene, or a combination thereof; and
   one or more additional additives selected from stabilizers, costabilizers, talc, UV stabilizers, lubricants, plasticizers, ultraviolet screening agents, oxidants, anti-static agents, ultraviolet light absorbents, processing oils, mold release agents, pigments, dyes, fillers, fragrances, odor masking agents, foaming aids, and deterioration inhibitors,
   wherein an amount of the solubility and/or retention additive is selected such that extrusion of the PS composition produces the extruded foam having the increased blowing agent concentration and/or blowing agent retention relative to the extruded foam made from a same PS composition absent the solubility and/or retention additive;
   wherein the polystyrene is selected from PS copolymers containing a metallic monomer, glycidyl methacrylate, or 2-hydroxylethyl methacrylate.

2. The PS composition of claim 1 comprising from about 0.01 to 10.0 weight percent (wt %) of the solubility and/or retention additive, said weight percentages being based on the total amount of the polystyrene and the solubility and/or retention additive in the PS composition.

3. The PS composition of claim 1, wherein the retention additive consists of the MO.

4. The PS composition of claim 1, wherein the polystyrene has a melt flow rate (MFR), as measured by ASTM D-1238 in the range of from 0.2 to 30 grams (g)/10 minutes (min).

5. A low density polystyrene (PS) foam produced via extrusion of the PS composition of claim 1, wherein the low density PS foam contains the increased blowing agent concentration relative to the extruded foam made from the same PS composition absent the solubility and/or retention additive.

6. A low density polystyrene (PS) foam produced via extrusion of the PS composition of claim 1, wherein the low density PS foam exhibits at least one superior insulative property relative to that of an otherwise similar low density foam that does not contain the solubility and/or retention additive.

7. A low density polystyrene (PS) foam produced via extrusion of the PS composition of claim 1, wherein the low density PS foam exhibits at least one mechanical property that is at least comparable to that of an otherwise similar low density foam that does not contain the solubility and/or retention additive.

8. A polystyrene (PS) composition for making an extruded foam having an increased blowing agent concentration and/or blowing agent retention relative to an extruded foam made from a same PS composition absent a solubility and/or retention additive, the PS composition consisting essentially of:
   polystyrene;
   a blowing agent consisting of carbon dioxide;
   the solubility and/or retention additive consists of epoxidized polybutadiene; and
   one or more additional additives selected from stabilizers, costabilizers, talc, UV stabilizers, lubricants, plasticizers, ultraviolet screening agents, oxidants, anti-static agents, ultraviolet light absorbents, processing oils, mold release agents, pigments, dyes, fillers, fragrances, odor masking agents, foaming aids, and deterioration inhibitors,
   wherein an amount of the solubility and/or retention additive is selected such that extrusion of the PS composition produces the extruded foam having the increased blowing agent concentration and/or blowing agent retention relative to the extruded foam made from a same PS composition absent the solubility and/or retention additive.

9. A low density polystyrene (PS) foam produced via extrusion of the PS composition of claim 8, wherein the low density PS foam exhibits at least one insulative property that is at least equivalent to that of an otherwise similar low density foam produced in the absence of the solubility and/or retention additive and with one or more blowing agents selected from hydrofluorocarbons (HFCs).

10. A method of increasing a blowing agent concentration and/or a blowing agent retention relative to an extruded foam made from a same foamable mixture absent a solubility and/or retention additive during the producing of a low density polystyrene (PS) foam, the method comprising:
    forming a foamable mixture consisting of polystyrene (PS), a blowing agent, the solubility and/or retention additive, wherein the solubility and/or retention is selected from mineral oil (MO), epoxidized polybutadiene, or a combination thereof, and one or more additional additives selected from stabilizers, costabilizers, talc, UV stabilizers, lubricants, plasticizers, ultraviolet screening agents, oxidants, anti-static agents, ultraviolet light absorbents, processing oils, mold release agents, pigments, dyes, fillers, fragrances, odor masking agents, foaming aids, coloring agents, and deterioration inhibitors wherein the blowing agent comprises one or more hydrofluoroolefins (HFOs) or comprises the one or more HFOs and carbon dioxide as a co-blowing agent;
    producing the extruded foam by extruding the foamable mixture through a die and into a region of reduced pressure; and
    optimizing an amount of the solubility and/or retention additive such that the extruded foam has an increased blowing agent concentration and/or blowing agent retention relative to an extruded foam made from a same foamable mixture absent the solubility and/or retention additive and retains at least one desired mechanical property of the extruded foam.

11. The method of claim 10, wherein the foamable mixture comprises from about 0.01 to 10.0 weight percent (wt %) of the solubility and/or retention additive.

12. The method of claim 10, wherein the solubility of the blowing agent in the foamable mixture is at least 5% greater than the solubility of the blowing agent in an otherwise similar foamable mixture absent the solubility and/or retention additive.

13. The method of claim 10, wherein the PS is selected from crystal polystyrene, high impact polystyrene (HIPS), PS copolymers, or a combination thereof.

14. A method of increasing a blowing agent concentration and/or a blowing agent retention relative to an extruded foam made from a same foamable mixture absent a solubility and/or retention additive during the producing of a low density polystyrene (PS) foam, the method comprising:
   forming a foamable mixture consisting of polystyrene (PS), a blowing agent, the solubility and/or retention additive, wherein the solubility and/or retention is selected from mineral oil (MO), epoxidized polybutadiene, or a combination thereof, and one or more additional additives selected from stabilizers, costabilizers, talc, UV stabilizers, lubricants, plasticizers, ultraviolet screening agents, oxidants anti-static agents, ultraviolet light absorbents, processing oils, mold release agents, coloring agents, pigments, dyes, fillers, fragrances, odor masking agents, foaming aids, and deterioration inhibitors, wherein the blowing agent comprises one or more hydrofluoroolefins (HFOs) or comprises the one or more HFOs and carbon dioxide as a co-blowing agent;
   producing the extruded foam by extruding the foamable mixture through a die and into a region of reduced pressure; and
   optimizing an amount of the solubility and/or retention additive such that the extruded foam has an increased blowing agent concentration and/or blowing agent retention relative to an extruded foam made from a same foamable mixture absent the solubility and/or retention additive and retains at least one desired mechanical property of the extruded foam,
   wherein the polystyrene (PS) is a PS copolymer containing a metallic monomer, glycidyl methacrylate, or 2-hydroxylethyl methacrylate.

15. The method of claim 10, wherein the polystyrene has a melt flow rate (MFR), as measured by ASTM D-1238 in the range of from 0.2 to 30 grams (g)/10 minutes (min).

16. A low density polystyrene (PS) foam produced via the method of claim 10.

17. The low density PS foam of claim 16, wherein the low density PS foam contains a higher blowing agent concentration or exhibits at least one superior insulative or mechanical property relative to that of a same low density foam produced in the absence of the solubility and/or retention additive.

18. The low density PS foam of claim 16, wherein the low density PS foam exhibits at least one insulative property that is at least equivalent to that of a same low density foam produced in the absence of the solubility and/or retention additive.

19. The low density PS foam of claim 16, wherein the PS foam exhibits increased retention of the blowing agent after at least 15 days.

20. A method of producing a low density polystyrene (PS) foam, the method comprising: forming a foamable mixture consisting of polystyrene (PS), a blowing agent, a solubility and/or retention additive selected from mineral oil (MO), epoxidized polybutadiene, or a combination thereof, and one or more additional additives selected from stabilizers, costabilizers, talc, UV stabilizers, lubricants, plasticizers, ultraviolet screening agents, oxidants, anti-static agents, ultraviolet light absorbents, processing oils, mold release agents, pigments, dyes, fillers, fragrances, odor masking agents, foaming aids, and deterioration inhibitors; and producing a foam by extruding the foamable mixture through a die and into a region of reduced pressure, wherein the blowing agent comprises one or more hydrofluoroolefins (HFOs) or comprises the one or more HFOs and carbon dioxide as a co-blowing agent, and optimizing an amount of the solubility and/or retention additive to provide a balance between increased solubility and/or retention of the blowing agent in the foamable mixture and retention of at least one desired mechanical property of the low density PS foam.

21. A low density polystyrene (PS) foam produced via extrusion of a PS composition consisting essentially of:
   polystyrene;
   a blowing agent consisting of carbon dioxide;
   a solubility and/or retention additive consisting of epoxidized polybutadiene; and
   one or more additional additives selected from stabilizers, costabilizers, talc, UV stabilizers, lubricants, plasticizers, ultraviolet screening agents, oxidants, anti-static agents, ultraviolet light absorbents, processing oils, mold release agents, coloring agents, pigments, dyes, fillers, fragrances, odor masking agents, foaming aids, and deterioration inhibitors,
   wherein an amount of the solubility and/or retention additive is selected such that extrusion of the PS composition produces the extruded foam having the increased blowing agent concentration and/or blowing agent retention relative to the extruded foam made from a same PS composition absent the solubility and/or retention additive, and
   wherein the low density PS foam exhibits at least one mechanical property that is at least comparable to that of an otherwise similar low density foam that does not contain the solubility and/or retention additive.

* * * * *